US012258809B2

(12) United States Patent
Meakins

(10) Patent No.: US 12,258,809 B2
(45) Date of Patent: Mar. 25, 2025

(54) GLAZING FRAMING SYSTEM AND METHOD

(71) Applicant: Kygee Pty Ltd, Belmont (AU)

(72) Inventor: Brett Meakins, Belmont (AU)

(73) Assignee: Kygee Pty Ltd, Belmont (AU)

( * ) Notice: Subject to any disclaimer, the term of this patent is extended or adjusted under 35 U.S.C. 154(b) by 625 days.

(21) Appl. No.: 17/455,581

(22) Filed: Nov. 18, 2021

(65) Prior Publication Data

US 2022/0074256 A1 Mar. 10, 2022

Related U.S. Application Data

(62) Division of application No. 16/495,693, filed as application No. PCT/AU2018/050313 on Apr. 5, 2018, now Pat. No. 11,230,876.

(30) Foreign Application Priority Data

Apr. 10, 2017 (AU) ................................ 2017901311
Feb. 1, 2018 (AU) ................................ 2018900317

(51) Int. Cl.
*E06B 3/12* (2006.01)
*E04B 2/96* (2006.01)
(Continued)

(52) U.S. Cl.
CPC .................. *E06B 3/12* (2013.01); *E04B 2/96* (2013.01); *E04B 2/967* (2013.01); *E05D 5/0223* (2013.01); *E06B 2003/5472* (2013.01)

(58) Field of Classification Search
CPC .. E06B 3/12; E06B 2003/5472; E05D 5/0223
See application file for complete search history.

(56) References Cited

U.S. PATENT DOCUMENTS 3,566,539 A * 3/1971 Ridgley ................ E05D 5/0223 16/382
3,681,876 A * 8/1972 Linder ...................... E06B 1/12 49/504

(Continued)

FOREIGN PATENT DOCUMENTS

CN 201739904 U 2/2011
CN 202227872 5/2012

(Continued)

OTHER PUBLICATIONS

International Search Report and Written Opinion issued in International Application No. PCT/AU2018/050313, Jul. 6, 2018, 15 pages.

(Continued)

*Primary Examiner* — Adriana Figueroa
(74) *Attorney, Agent, or Firm* — HSML P.C.

(57) ABSTRACT

A first embodiment of an aluminium extrusion framing system comprises a first wedge member and a second wedge member made of resilient material for securing and sealing a panel in the framing system. The framing system also comprises an aluminium extrusion having a channel adapted to receive an edge of the panel therein. A first side wall is formed with a first elongate retention means extending the full length of the extrusion for receiving the first wedge member in connection therewith. A removable cover plate is adapted to be secured to the extrusion and received in close proximity to a top edge of the first side wall of the channel whereby, in use, when the panel is installed in the channel with the first wedge member received in connection with the first retention means, the first wedge member is substantially concealed when the removable cover plate is secured to the extrusion.

5 Claims, 22 Drawing Sheets

(51) Int. Cl.
*E05D 5/02* (2006.01)
*E06B 3/54* (2006.01)

(56) References Cited

U.S. PATENT DOCUMENTS

| | | | | |
|---|---|---|---|---|
| 3,783,559 | A | | 1/1974 | Yocum et al. |
| 4,006,573 | A | | 2/1977 | Biebuyck |
| 4,144,924 | A | * | 3/1979 | Vanden Hoek ....... E04B 2/7431 16/225 |
| 4,236,354 | A | | 12/1980 | Passovoy |
| 4,594,831 | A | * | 6/1986 | Winyard ................. E06B 1/045 52/212 |
| 4,899,508 | A | | 2/1990 | Biebuyck |
| 4,914,888 | A | | 4/1990 | Hanson |
| 4,930,257 | A | * | 6/1990 | Windgassen ............ E06B 1/325 49/504 |
| 5,313,724 | A | | 5/1994 | Warner |
| 5,339,583 | A | | 8/1994 | Hrdlicka et al. |
| 5,522,540 | A | | 6/1996 | Surman |
| 5,649,378 | A | | 7/1997 | Roesser, Jr. et al. |
| 6,158,182 | A | | 12/2000 | Biebuyck |
| 6,708,876 | B1 | | 3/2004 | Shirah |
| 6,715,248 | B2 | | 4/2004 | Biebuyck |
| 6,719,193 | B2 | | 4/2004 | Katulka |
| 6,912,817 | B1 | | 7/2005 | Sabac et al. |
| 6,993,873 | B2 | | 2/2006 | Biebuyck et al. |
| 7,941,982 | B2 | | 5/2011 | Merica |
| 8,070,310 | B2 | | 12/2011 | Harwood |
| 8,721,106 | B2 | | 5/2014 | Boissevain et al. |
| 9,812,042 | B2 | | 11/2017 | Mulder et al. |
| 10,273,742 | B2 | * | 4/2019 | Strickland ................. E06B 3/76 |
| 10,720,087 | B2 | | 7/2020 | Phuklin Prichystal |
| 2005/0129395 | A1 | | 6/2005 | Sabac |
| 2005/0138889 | A1 | | 6/2005 | Biebuyck |
| 2007/0204499 | A1 | | 9/2007 | Sudack et al. |
| 2008/0236006 | A1 | | 10/2008 | Chadwell et al. |
| 2012/0073207 | A1 | | 3/2012 | Shearer |
| 2012/0102801 | A1 | | 5/2012 | Lee |

FOREIGN PATENT DOCUMENTS

| | | | | | |
|---|---|---|---|---|---|
| DE | 41 09 532 | | | 10/1991 | |
| DE | 20 2014 001 297 | | | 4/2014 | |
| EP | 2093362 | A1 | * | 8/2009 | ........... E05D 5/0223 |
| EP | 3 009 580 | | | 4/2016 | |
| FR | 2 896 906 | | | 8/2007 | |
| FR | 2 930 270 | | | 10/2009 | |
| GB | 2 016 569 | | | 9/1979 | |
| GB | 2 073 295 | | | 10/1981 | |
| GB | 2512150 | | | 9/2014 | |
| GB | 2540674 | | | 1/2017 | |
| IT | 0128259 | A2 | * | 12/1984 | |
| WO | 2013/121330 | | | 8/2013 | |
| WO | WO-2015024297 | A1 | * | 2/2015 | ......... E05D 11/0054 |

OTHER PUBLICATIONS

International Type Search Report issued in Australian Application No. 2017901311, May 30, 2017, 11 pages.
International Type Search Report issued in Australian Application No. 2018900317, Mar. 21, 2018, 12 pages.

* cited by examiner

GLAZING FRAMING SYSTEM AND METHOD

FIELD OF THE INVENTION

The present invention relates to a glazing framing system and method and relates particularly, though not exclusively, to such a system and method for securing glass in an aluminium frame extrusion. The invention also relates to a framing system with a concealed hinge cavity and relates particularly, though not exclusively, to such a system with a concealed hinge cavity in an aluminium frame extrusion.

BACKGROUND TO THE INVENTION

In prior art glazing systems it is common to provide a frame made from an aluminium extrusion. The extrusion has a channel in which the edge of a glass panel or pane is received, together with one or more rubber or PVC glazing wedges to secure and seal the panel in the extrusion. Typically two wedges are received in the extrusion, one on each side of the glass panel, and one or both of these wedges are clearly visible around the whole perimeter of the window or door after installation. Typically the wedges are coloured black or perhaps a neutral colour, but they are frequently of contrasting colour with the adjacent extrusion, and therefore to some extent detract from the aesthetic appearance of the window or door frame.

The present invention was developed with a view to providing an aluminium extrusion framing system and method in which the wedges used to secure and seal the glazing panel in the aluminium extrusion are substantially hidden from view or concealed after installation. It will be appreciated that the present invention is not limited in its application to glazing panels for windows and doors, but may also be employed with any other kind of panel which is secured into an aluminium extrusion with one or more wedge members.

The present invention was also developed with a view to providing a framing system in which the hinges used to secure a door or window panel in the framing system are substantially hidden from view or concealed after installation. It will be appreciated that the present invention is not limited in its application to panels for windows and doors, but may also be employed with any other kind of panel which is secured into an aluminium extrusion with one or more hinges.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided an aluminium extrusion for a framing system, the extrusion comprising:

a channel adapted to receive an edge of a panel therein, the channel being formed by a pair of opposing side walls, a first side wall having a first elongate retention means extending the full length of the extrusion for receiving a first wedge member in connection therewith;

a cavity provided adjacent to the channel between a side wall of the extrusion and the first side wall of the channel; and, a removable cover plate adapted to be secured to the extrusion and received in close proximity to a top edge of the first side wall of the channel so as to extend over the cavity no further than a top edge of the side wall of the extrusion whereby, in use, when a panel is installed in the channel with a wedge member received in connection with the first elongate retention means, the wedge member is substantially concealed when the cover plate is secured to the extrusion.

Preferably the wedge member is one of a pair of wedge members, and the framing system further comprises a second wedge member made of resilient material for securing and sealing a panel in the framing system.

Preferably a second side wall of the channel is formed with a second elongate retention means extending the full length of the extrusion for receiving the second wedge member in connection therewith.

In one embodiment, an elongate lip is provided along a top edge of the second side wall of the channel.

Preferably both the elongate lip and the cover plate each have an edge that lies adjacent to and in close proximity to the panel after installation.

According to another aspect of the present invention there is provided an aluminium extrusion framing system, the framing system comprising:

a first wedge member made of resilient material for securing and sealing a panel in the framing system;

an aluminium extrusion having a channel adapted to receive an edge of a panel therein, the channel being formed by a pair of opposing side walls, a first side wall having a first elongate retention means extending the full length of the extrusion for receiving the first wedge member in connection therewith, the extrusion also having a cavity provided adjacent to the channel between a side wall of the extrusion and the first side wall of the channel; and, a removable cover plate adapted to be secured to the extrusion and received in close proximity to a top edge of the first side wall of the channel so as to extend over the cavity no further than a top edge of the side wall of the extrusion whereby, in use, when a panel is installed in the channel with the first wedge member received in connection with the first retention means, the first wedge member is substantially concealed when the removable cover plate is secured to the extrusion.

Preferably the first wedge member is one of a pair of wedge members, and the framing system further comprises a second wedge member made of resilient material for securing and sealing a panel in the framing system.

Preferably a second side wall is formed with a second elongate retention means extending the full length of the extrusion for receiving the second wedge member in connection therewith.

In one embodiment, an elongate lip is provided along a top edge of the second side wall of the channel.

Advantageously a lighting fixture can be installed behind the removable cover plate, in a cavity provided within the aluminium extrusion wherein, in use, a lighting effect can be created adjacent to the panel. In one embodiment the lighting effect is a pattern, words, logo or other indicia laser cut into the cover plate so that, in use, when the lighting fixture is switched ON light shines through laser cut to create the lighting effect. Preferably a coloured filter and/or diffuser is installed within or behind the cover plate to create or enhance the lighting effect.

According to another aspect of the present invention there is provided a method of installing a panel in a framing system comprises an aluminium extrusion having a channel adapted to receive an edge of the panel therein, the channel being formed by a pair of opposing side walls, and the extrusion also having a cavity provided adjacent to the channel between a side wall of the extrusion and the first side wall of the channel, the method comprising the steps of:

inserting a panel in the channel;

inserting a first wedge member into a gap formed between the panel and a first side wall of the channel, so that the wedge member engages with a first elongate retention means formed on the first side wall of the channel and extending the full length of the extrusion for receiving the first wedge member in connection therewith; and, securing a removable cover plate to the extrusion in close proximity to a top edge of the first side wall of the channel so as to extend over the cavity no further than a top edge of the side wall of the extrusion whereby, in use, the first wedge member is substantially concealed by the cover plate.

Preferably the method further comprises, prior to the step of inserting the panel in the channel, inserting a second wedge member in a second elongate retention means formed on a second side wall of the channel and extending the full length of the extrusion for receiving the second wedge member in connection therewith. In one embodiment, an elongate lip is provided along a top edge of the second side wall of the channel, and the position of the second elongate retention means on the second side wall, and the shape of the second wedge member is such that it is substantially concealed below the elongate lip.

According to a further aspect of the present invention there is provided a framing system for a panel, the framing system comprising:

an extrusion having a cavity in which part of a hinge for a panel can be concealed, the cavity having a cut-out portion through which part of the hinge to be concealed is extended;

a hinge for the panel, wherein the part of the hinge received in the cavity has a modified shape to match a profile of the extrusion in a region of the cut-out portion, and wherein when the part of the hinge to be concealed is received in the cavity a portion of the hinge replaces the cut-out portion of the cavity; and, a removable cover plate adapted to be secured to the extrusion to cover the cavity whereby, in use, the part of the hinge is substantially concealed when the removable cover plate is secured to the extrusion.

In one embodiment the hinge for a panel is a hinge for holding two or more doors together in a bi-fold door framing system.

In another embodiment the hinge for a panel is a hinge for holding a door in a door jamb framing system.

According to yet another aspect of the present invention there is provided a framing system for a panel, the framing system comprising:

an extrusion having a cavity in which part of a holding mechanism for holding a panel in place in the framing system can be concealed, the holding mechanism comprising a magnetic catch mechanism or a lock mechanism that is adapted to be mechanically connected to the extrusion and/or the panel and to retain the panel in a closed position;

a removable cover plate adapted to be secured to the extrusion to cover the cavity whereby, in use, the part of the holding mechanism is substantially concealed when the removable cover plate is secured to the extrusion.

According to a still further aspect of the present invention there is provided an extrusion for a framing system, the extrusion comprising:

a cavity in which part of a holding mechanism for holding a panel in place in the framing system can be concealed, the holding mechanism comprising a magnetic catch mechanism or a lock mechanism that is adapted to be mechanically connected to the extrusion and/or the panel and to retain the panel in a closed position;

a removable cover plate adapted to be secured to the extrusion to cover the cavity whereby, in use, the part of the holding mechanism is substantially concealed when the removable cover plate is secured to the extrusion.

Typically the magnetic catch mechanism comprises first and second magnets, which when brought into close proximity exert a strong attractive force to retain the panel in a closed position. Preferably the first magnet is concealed within a cavity in an extrusion for a frame forming a jamb for the panel, and the second magnet is concealed within a cavity in an extrusion for a frame of the panel.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of an aluminium extrusion framing system and method, given by way of example only, with reference to the accompanying drawings, in which:

FIG. 28(*b*) is a section view through the extrusion framing system of FIG. 26;

DETAILED DESCRIPTION OF PREFERRED EMBODIMENTS

Figure 3:
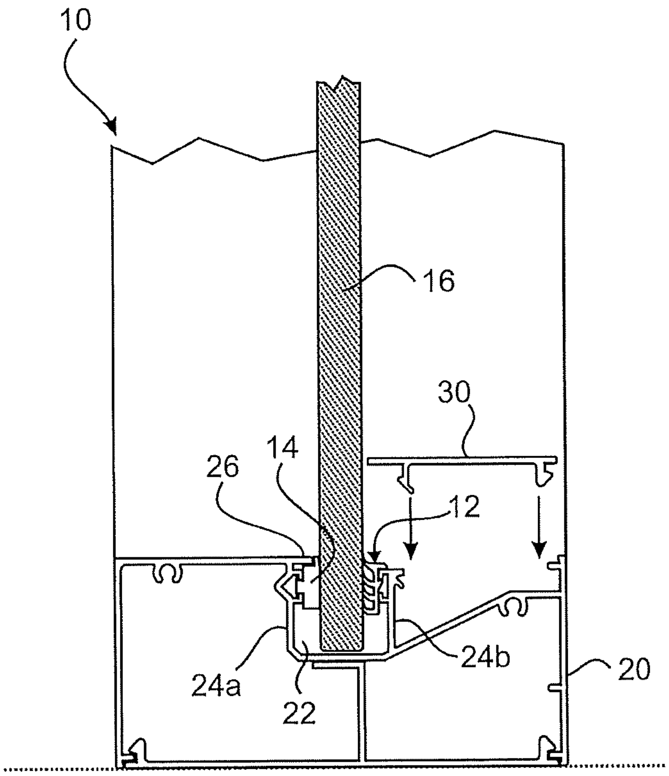
FIG. 3 is a section view through the aluminium extrusion framing system of FIG. 1, showing a final step in the preferred method of assembling the framing system.
Figure 4:
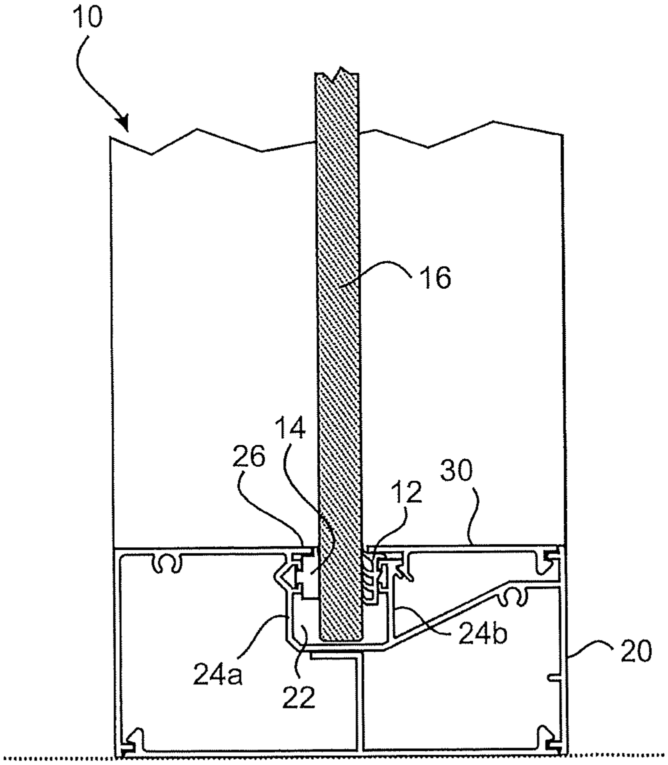
FIG. 4 is a section view through the aluminium extrusion framing system of FIG. 1, showing the framing system in its fully assembled condition.
Figure 5:
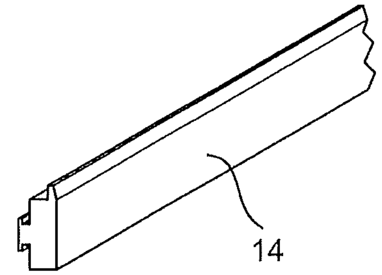
FIGS. 5 and 6 illustrate respectively preferred embodiments of second and first wedge members employed in the framing system of FIG. 1.
Figure 6:
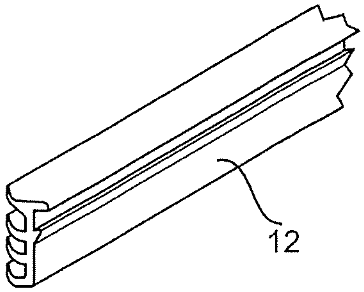
Figure 7:
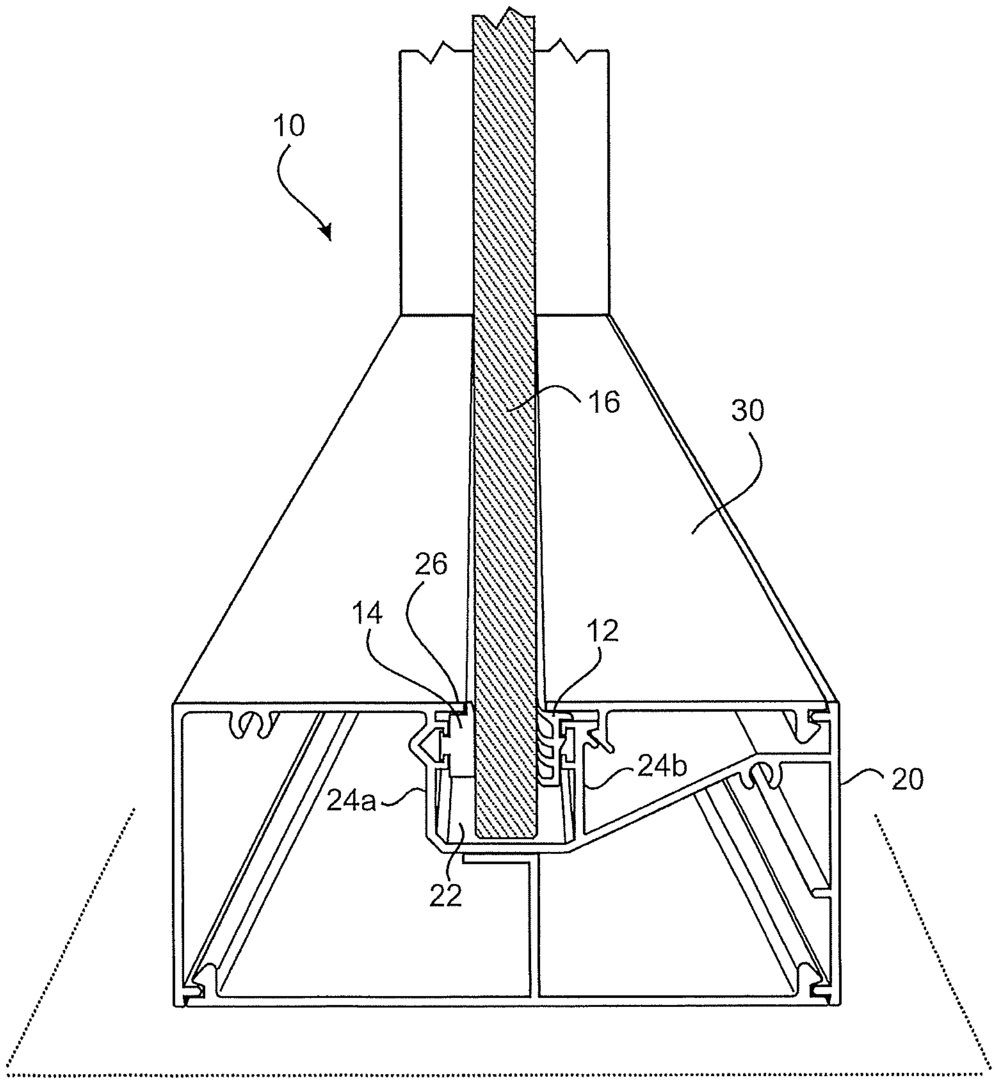
FIG. 7 is an end perspective view of the aluminium extrusion framing system of FIG. 1, showing the framing system in its fully assembled condition.
Figure 8:
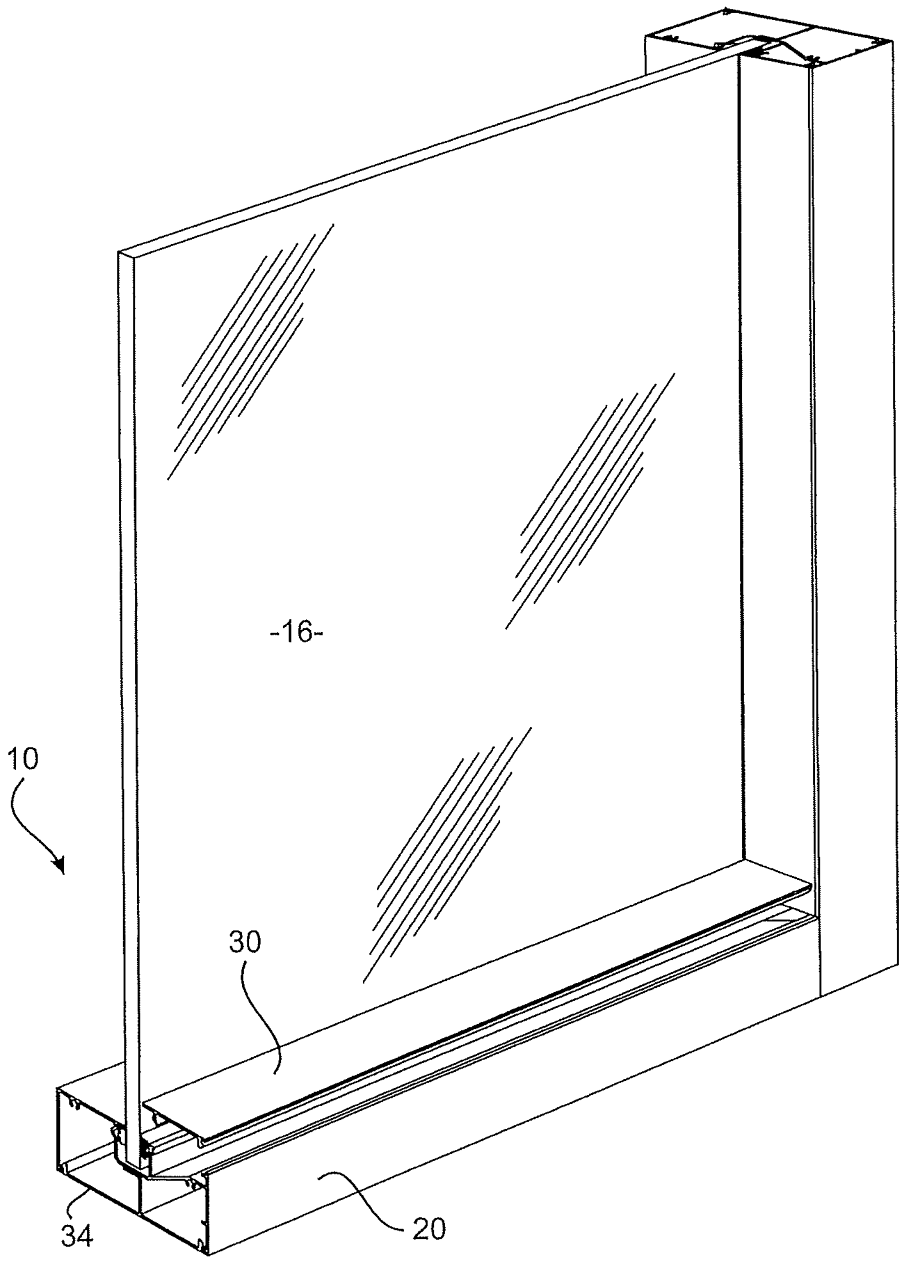
FIG. 8 is a side perspective view of the aluminium extrusion framing system of FIG. 1, showing the framing system in a partially assembled condition.

A first embodiment of an aluminium extrusion framing system 10 in accordance with the invention, as illustrated in FIGS. 1 to 10, comprises a first wedge member 12 made of resilient material for securing and sealing a panel 16 in the framing system. Preferably the first wedge member 12 is one of a pair of wedge members, and a second wedge member 14 is also provided for securing and sealing the panel 16 in the framing system. Preferred embodiments of the first and second wedge members 12 and 14 are illustrated in FIGS. 6 and 5 respectively. The wedge members 12 and 14 are typically manufactured from rubber or a resilient plastics material, such as PVC or silicon.

The framing system 10 also comprises an aluminium extrusion 20 having a channel 22 adapted to receive an edge of the panel 16 therein. A first side wall 24*b* is formed with a first elongate retention means 28 extending the full length of the extrusion 20 for receiving the first wedge member 12 in connection therewith.

The framing system 10 further comprises a removable cover plate 30 adapted to be secured to the extrusion 20 and received in close proximity to a top edge of the first side wall 24*b* of the channel 22 whereby, in use, when the panel 16 is installed in the channel 22 with the first wedge member 12 received in connection with the first retention means 28, the first wedge member 12 is substantially concealed when the removable cover plate 30 is secured to the extrusion 20. The first elongate retention means 28 is preferably located so that, in use, when the first wedge member 12 is received in connection therewith it does not protrude above the cover plate 30. This concealing function of the removable cover plate 30 is clearly illustrated in FIGS. 3 and 4.

In this embodiment the channel 22 has a pair of opposing side walls 24 and an elongate lip 26 provided along a top edge of a second side wall 24*a*. Preferably the second side wall 24*a* of the channel 22 is formed with a second elongate retention means 32 extending the full length of the extrusion 20 for receiving the second wedge member 14 in connection therewith. The first and second retention means 28 and 32 of this embodiment are similar in design and function. Both are in the form of a groove adapted to receive part of the first and second wedge members 12 and 14 respectively therein. In both cases the groove of the retention means 28 and 32 is formed with a pair of inwardly extending, opposing lips extending the full length of the groove, which are designed to retain the part of the respective wedge member received in the groove therein.

The aluminium extrusion 20 of this embodiment also includes a base plate 34, which is received in the rear of the extrusion and is designed to close the rear of the extrusion. The base plate 34 has an L-shaped upstand which supports the rear of channel 22 of the extrusion, particularly when it bears the weight of the panel 16 therein.

Figure 9:
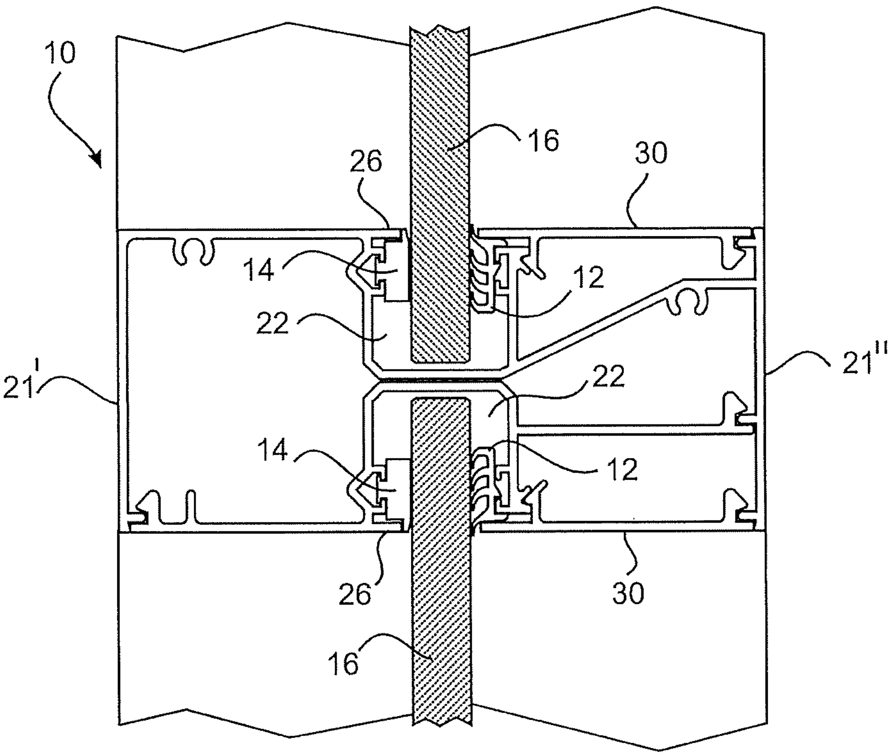
FIG. 9 is a section view through the aluminium extrusion framing system of FIG. 1, showing a different type of extrusion employed in the framing system.
Figure 10:
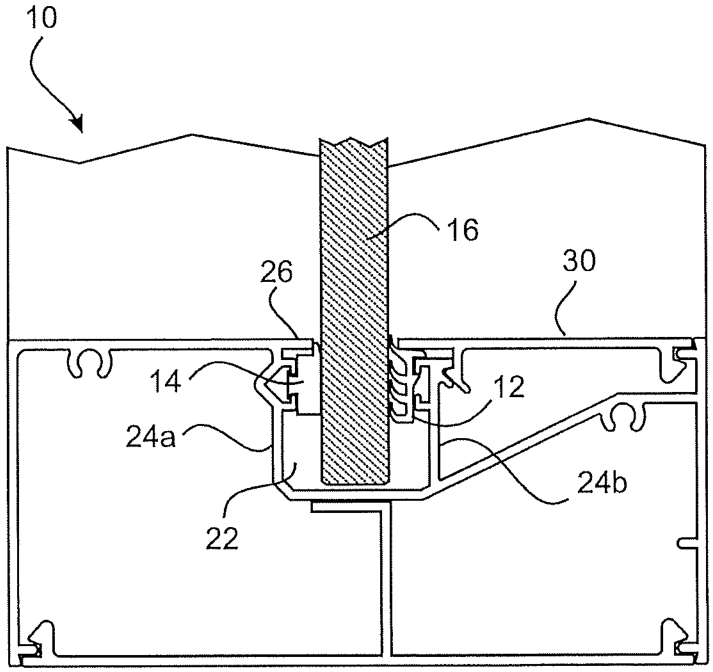
FIG. 10 is a section view through the aluminium extrusion framing system of FIG. 1, showing the framing system in its fully assembled condition.
Figure 11:
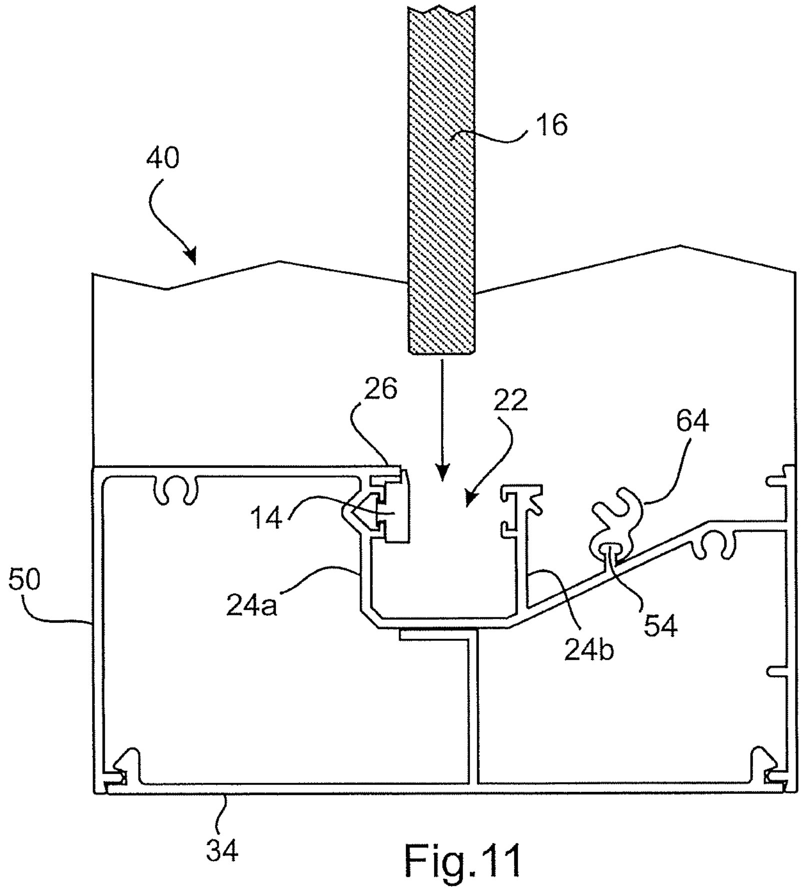
FIG. 11 is a section view through a second embodiment of an aluminium extrusion framing system according to the present invention, showing a step in a preferred method of assembling the framing system.
Figure 12:
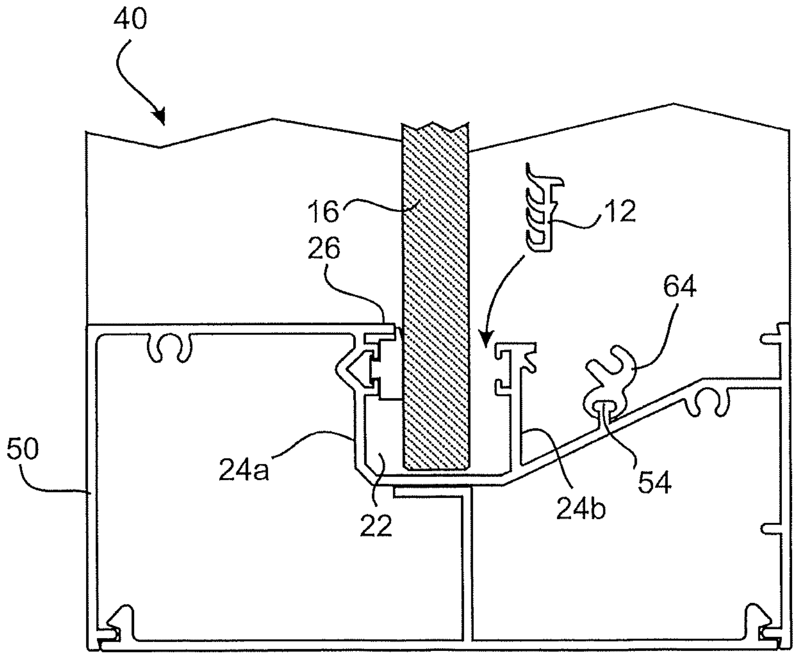
FIG. 12 is a section view through the aluminium extrusion framing system of FIG. 11, showing another step in the preferred method of assembling the framing system.

FIG. 9 illustrates another kind of aluminium extrusion 21 that forms part of the framing system 10. The extrusion 21 comprises two parts 21' and 21" which clip together back to back, to provide a join or sill between two panels 16 arranged one directly above the other. Each part of the extrusion 21 receives first and second wedge members 12, 14 in its respective channel 22 to wedge the edge of the panel 16 in the channel. Each part of the extrusion 21 is also provided with an elongate lip 26 and a removable cover plate 30. It will be understood that the aluminium extrusion for the framing system 10 can be manufactured in many different shapes and configurations to suit various framing requirements.

A preferred method of installing a panel 16, in this case a pane of glass, in an aluminium extrusion 20 of the framing system 10 will now be described with reference to FIGS. 1 to 7. The aluminium extrusion 20 is assembled, and the base plate 34 inserted in the rear. The second wedge member 14 is preferably inserted in connection with the second elongate retention means 32 on the second side wall 24*a*. It will be seen that the position of the second elongate retention means 32 on the second side wall 24*a*, and the shape of the second wedge member 14 is such that it is substantially concealed below the elongate lip 26, when installed.

Figure 1:
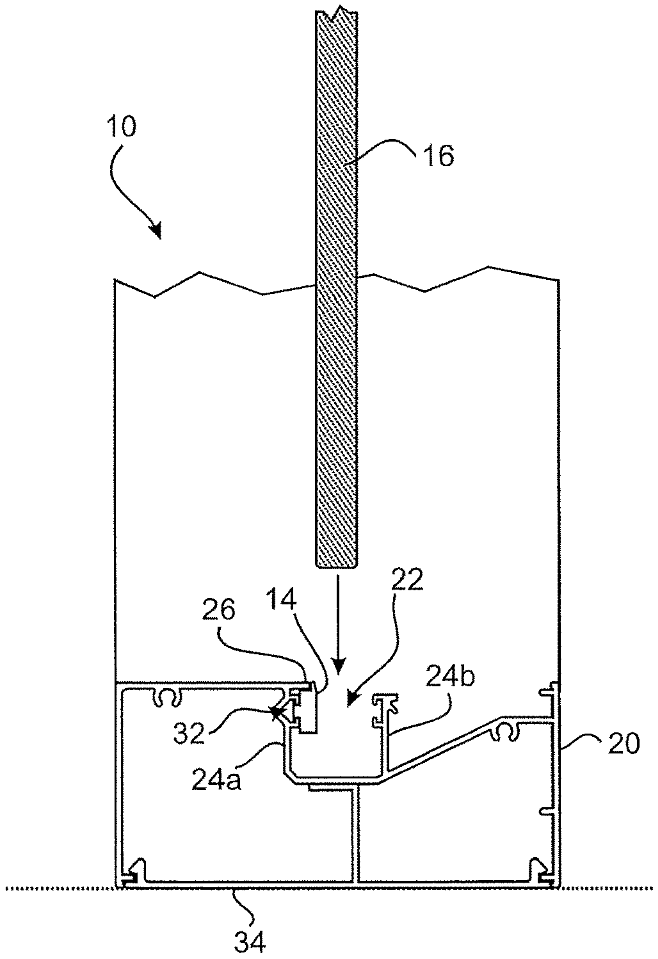
FIG. 1 is a section view through a first embodiment of an aluminium extrusion framing system according to the present invention, showing a step in a preferred method of assembling the framing system.
Figure 2:
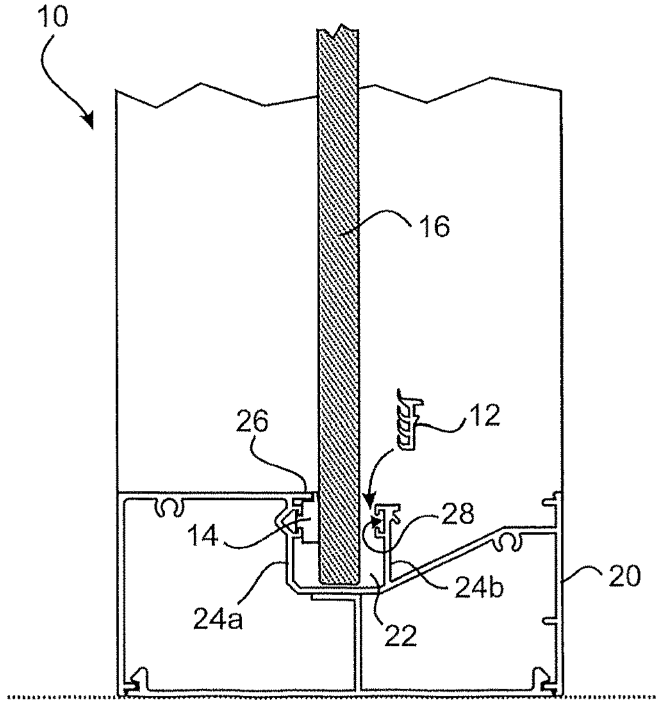
FIG. 2 is a section view through the aluminium extrusion framing system of FIG. 1, showing another step in the preferred method of assembling the framing system.

Next the glass pane 16 is installed in the framing system, with an edge of the pane 16 received in the channel 22 of the aluminium extrusion 20, pressed against the second wedge member 14, as shown in FIGS. 1 and 2. The channel 22 is, of course, designed and sized to receive a pane of this particular thickness therein. When the pane 16 is installed in the channel 22 an elongate edge of the elongate lip 26 lies adjacent to and in close proximity to the panel. Preferably, the second wedge member 14 is formed with a small lip that extends between the glass pane 16 and the edge of the elongate lip 26, as shown in FIG. 2. This ensures that the pane 16 is sealed within the channel 22 and inhibits the ingress of any water into the channel 22.

With the glass pane 16 thus correctly positioned in the channel 22, the first wedge member 12 is inserted into the narrow gap between the pane 16 and the first side wall 24*b* of the channel 22, as shown in FIG. 2. The first wedge member 12 is designed with a series of parallel vanes which flex as the wedge member 12 is inserted, allowing it to be squeezed into the narrow gap, as shown in FIGS. 3 and 4. A rear surface of the first wedge member 12 is formed with a protruding rib that catches under one of the lips provided for this purpose in the groove of the first elongate retention means 28. Once the first wedge member 12 is thus wedged into the narrow gap between the pane 16 and the second wall 24*b* of the channel 22, and retained by the first elongate retention means 28, it is virtually impossible to remove it, and the glass pane 16 will remain firmly and securely wedged in the channel 22.

Finally, the removable cover plate 30 is installed in the aluminium extrusion 20, as shown in FIG. 3. The removable cover plate 30 of this embodiment is provided with first and second elongate retaining clips on each edge along its length, which are designed to clip under matching elongate protrusions provided on the aluminium extrusion 20. Once the removable cover plate 30 is installed, an elongate edge of the removable cover plate 30 lies adjacent to and in close proximity to the glass pane 16, on the opposite side to the elongate lip 26. A top vane of the first wedge member 12 may extend into the small gap between the edge of the removable cover plate and the glass pane 16. However the removable cover plate 30 ensures that the first wedge member 12 is substantially concealed and hidden from view, when the removable cover plate 30 is secured to the extrusion 20. The end result is a less obvious and more aesthetically pleasing appearance of the join between the glass pane and the aluminium extrusion.

A second embodiment of an aluminium extrusion framing system 40 in accordance with the invention is illustrated in FIGS. 11 to 14. The framing system 40 is similar to the first embodiment of the framing system 10, and therefore the similar parts are identified with the same reference numerals and will not be described again in detail. The framing system 40 comprises a first wedge member 12 made of resilient material for securing and sealing a panel 16 in the framing system. Preferably the first wedge member 12 is one of a pair of wedge members, and a second wedge member 14 is also provided for securing and sealing a panel 16 in the framing system.

The framing system 40 also comprises an aluminium extrusion 50 having a channel 22 adapted to receive an edge of the panel 16 therein. The channel 22 has a pair of opposing side walls 24 and an elongate lip 26 provided along a top edge of a second side wall 24*a*. A first side wall 24*b* is formed with a first elongate retention means 28 extending the full length of the extrusion 20 for receiving the first wedge member 12 in connection therewith. The first elongate retention means 28 is located so that, in use, when the first wedge member 12 is received in connection therewith it does not protrude above the elongate lip 26.

Figure 13:
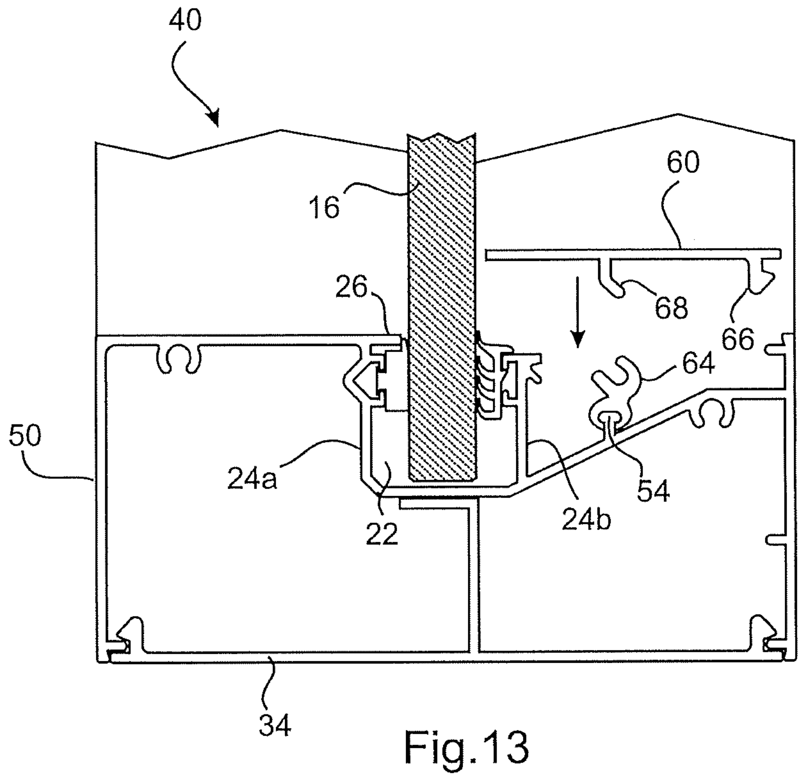
FIG. 13 is a section view through the aluminium extrusion framing system of FIG. 11, showing a final step in the preferred method of assembling the framing system.
Figure 14:
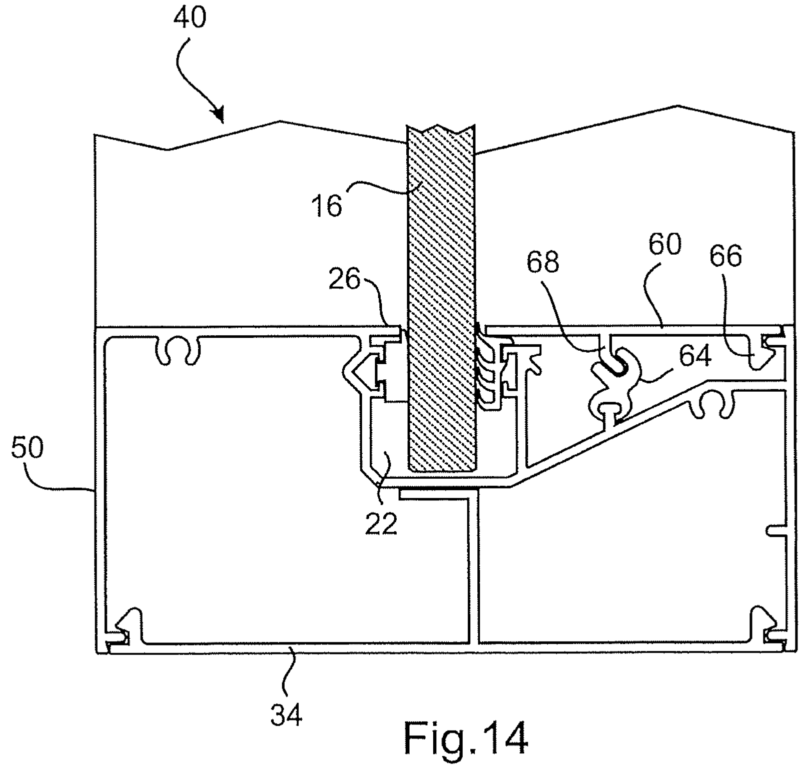
FIG. 14 is a section view through the aluminium extrusion framing system of FIG. 11, showing the framing system in its fully assembled condition.

As with the first embodiment 10, the framing system 40 further comprises a removable cover plate 60 adapted to be secured to the extrusion 50 and received in close proximity to a top edge of the first side wall 24*b* of the channel 22 whereby, in use, when the panel 16 is installed in the channel 22 with the first wedge member 12 received in connection with the first retention means 28, the first wedge member 12 is substantially concealed when the removable cover plate 60 is secured to the extrusion 50. This concealing function of the removable cover plate 30 is illustrated in FIGS. 13 and 14.

Preferably the second side wall 24*a* of the channel 22 is formed with a second elongate retention means 32 extending the full length of the extrusion 50 for receiving the second wedge member 14 in connection therewith.

The principal difference between this embodiment of the framing system 40 and the previous embodiment is the manner in which the removable cover plate 60 is secured to the extrusion 50. The removable cover plate 60 of this embodiment, is provided with a first elongate retaining clip 36 on one edge along its length (similar to the first embodiment), which is designed to clip under a matching elongate protrusion provided on the aluminium extrusion 50. A second elongate retaining clip 62 is provided along it length, intermediate the width of the removable cover plate 60, which is adapted to engage with a securing clip 64 provided in connection with the aluminium extrusion 50.

The aluminium extrusion 50 of this embodiment is provided with an additional elongate protrusion 54, provided on a wall of a cavity provided adjacent to the channel 22. The protrusion 54 is designed to receive the securing clip 64 in connection therewith. When both the first and second wedge members 12, 14 have been inserted in their respective first and second elongate retention means, the removable cover plate 60 is clipped into place and secured to the aluminium extrusion 50, as shown in FIGS. 13 and 14, the first wedge member 12 will be substantially concealed. The end result is a more aesthetically pleasing appearance of the join between the panel 16 and the aluminium extrusion 50, similar to that shown in FIG. 7.

The preferred method of installing a panel 16 in the framing system 40 of this embodiment is substantially the same as with the previous embodiment, and will not be described again in detail. The primary difference, as noted above, is the manner in which the removable cover plate 60 is clipped into place and secured to the aluminium extrusion 50.

Figure 15:
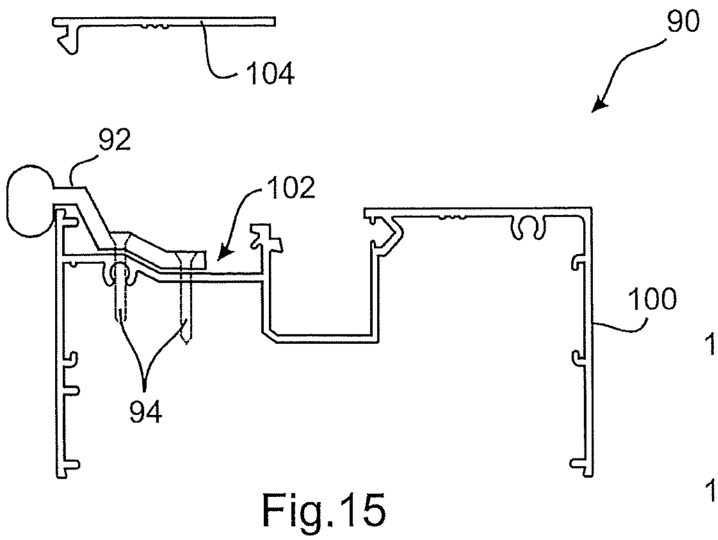
FIG. 15 is a section view through another embodiment of an aluminium extrusion framing system according to the present invention, for concealing a hinge, showing a first step in a preferred method of assembling the framing system.
Figure 16:
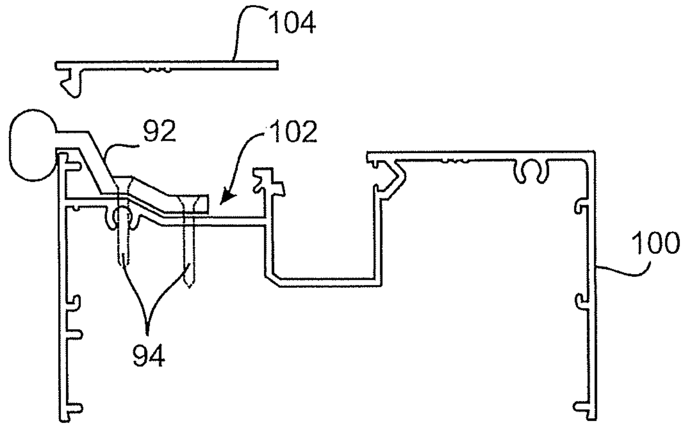
FIG. 16 is a section view through the aluminium extrusion framing system of FIG. 15, showing another step in the preferred method of assembling the framing system.
Figure 17:
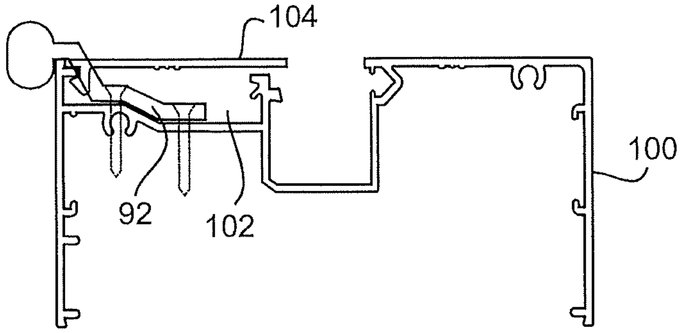
FIG. 17 is a section view through the aluminium extrusion framing system of FIG. 15, showing a final step in the preferred method of assembling the framing system.
Figure 18A:
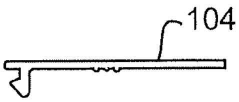
FIGS. 18*a* and 18*b* are an end view and a top plan view respectively of a removable cover plate employed in the aluminium extrusion framing system of FIG. 15.
Figure 18B:
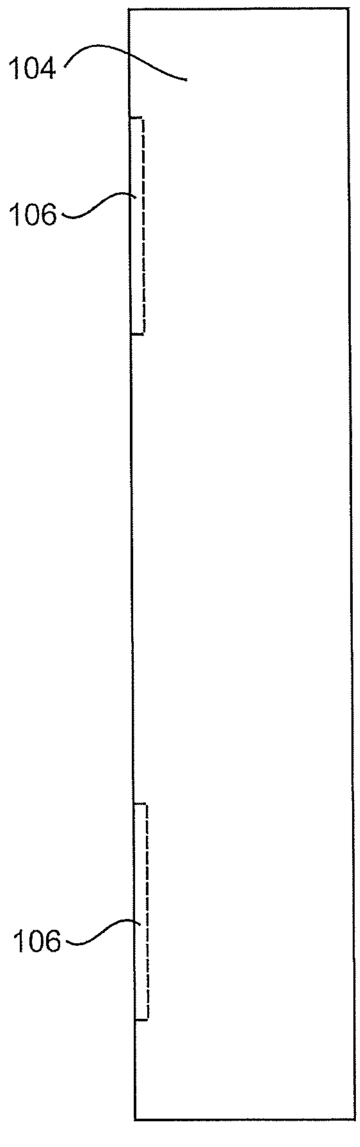
Figure 19A:
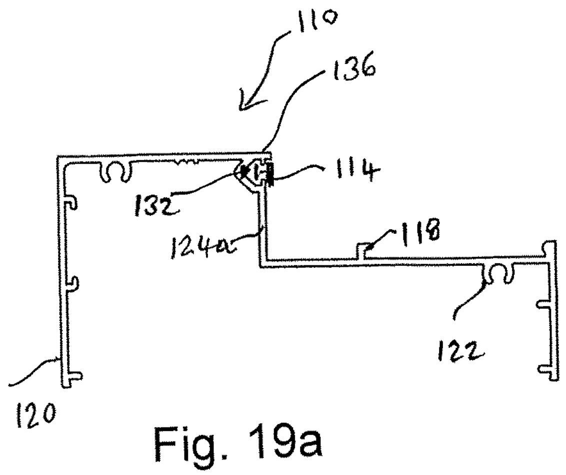
FIGS. 19*a* to 19*e* are section views through a further embodiment of an aluminium extrusion framing system according to the present invention, showing a sequence of steps in a preferred method of assembling the framing system.
Figure 19B:
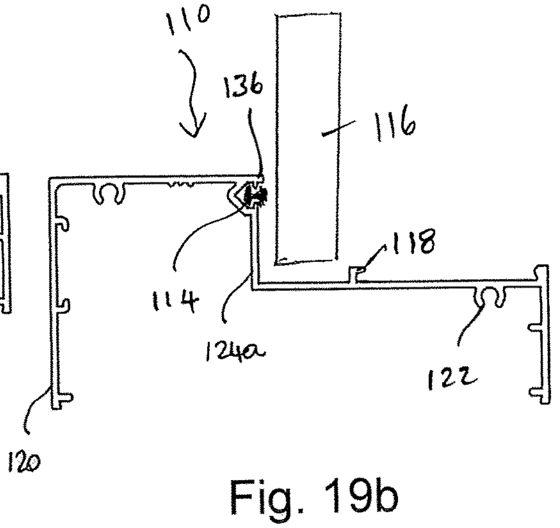
Figure 19C:
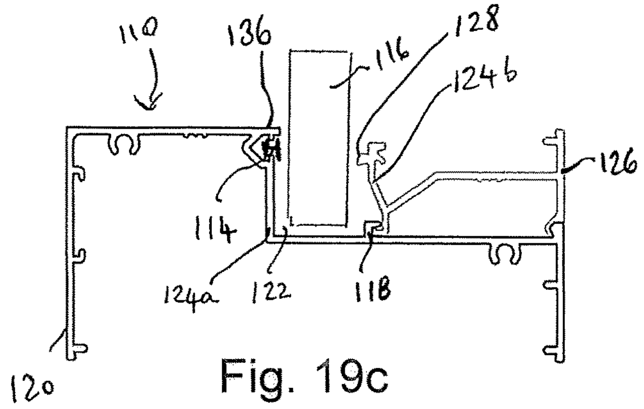
Figure 19D:
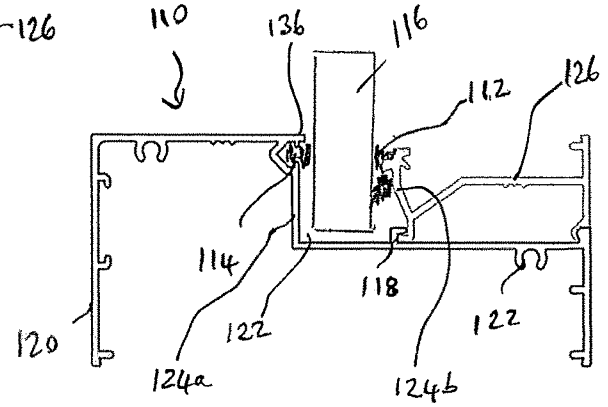
Figure 19E:
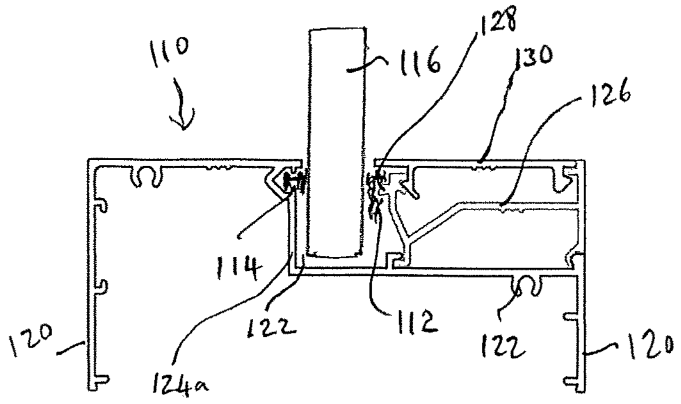
Figure 20A:
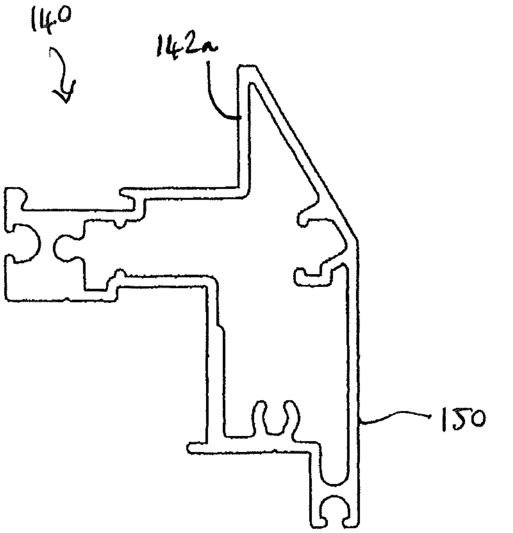
FIGS. 20*a*, 20*e* and 20*f* are section views through a still further embodiment of an aluminium extrusion framing system according to the present invention, showing a sequence of steps in a preferred method of assembling the framing system.
Figure 20B:
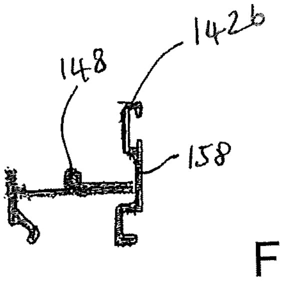
FIGS. 20*b*, 20*c* and 20*d* are section views of several components of the aluminium extrusion framing system of FIG. 20*f*.
Figure 20C:
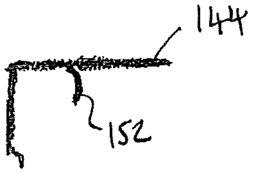
Figure 20D:
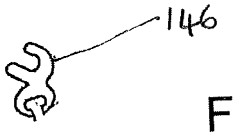
Figure 20E:
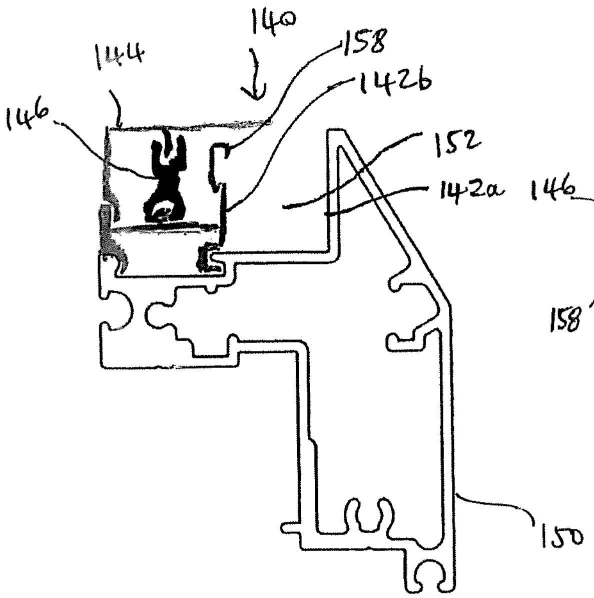
Figure 20F:
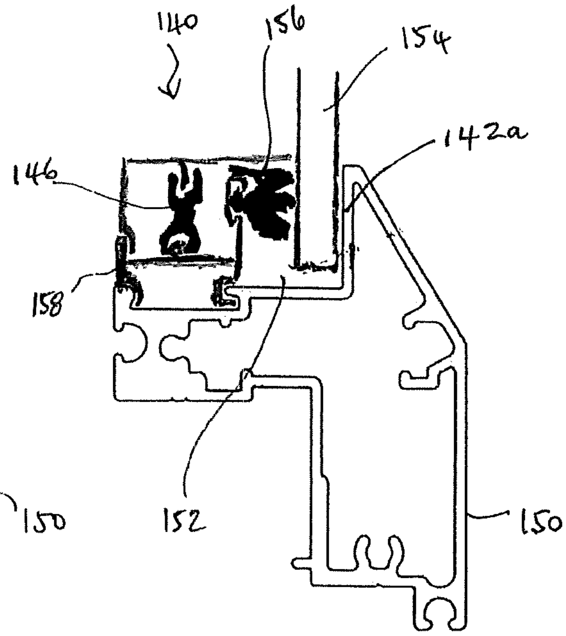
Figure 21:
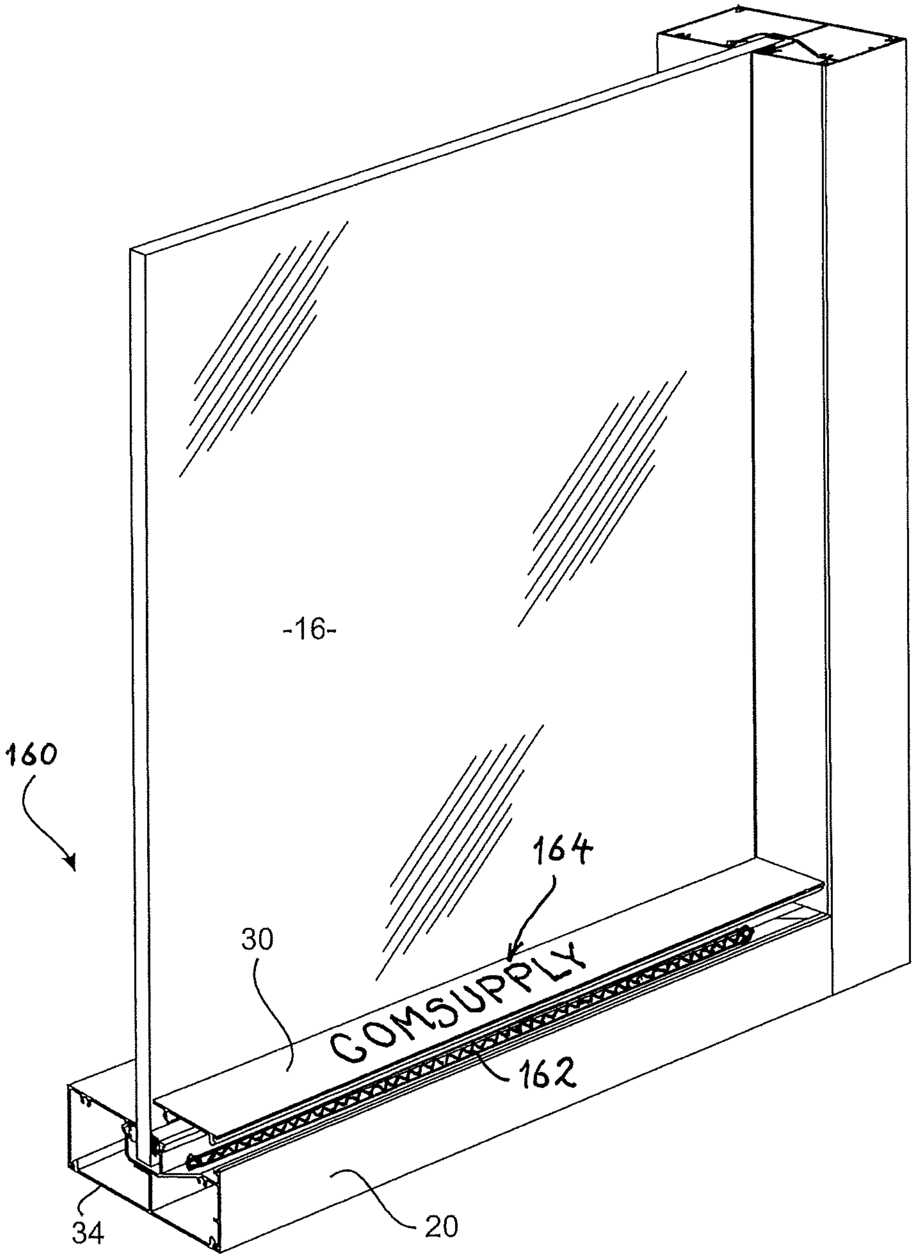
FIG. 21 is a perspective view of another embodiment of an aluminium extrusion framing system according to the present invention, for creating a lighting effect.

FIGS. 15 to 18 illustrate another embodiment of the aluminium extrusion framing system 90 according to the present invention, which can be used for concealing part of the hinge of a door. The framing system 90 comprises an aluminium extrusion 100, which is similar to the aluminium extrusion 20 of the previous embodiments. In this embodiment the aluminium extrusion 100 comprises a cavity 102 within which part of a hinge 92 can be concealed. The aluminium extrusion 100 would typically form part of a door frame for a door (not shown). As can be clearly seen in FIGS. 15 to 17 the part of the hinge to be concealed is bent so as to be received in the cavity 102. Screw fasteners 94, for connecting the hinge 92 to the door frame, can then be screwed through the hinge part into the door frame as shown in FIG. 15.

The framing system 90 further comprises a cover plate 104 which can be secured to the aluminium extrusion 100, and is adapted to cover the cavity 102. In use, the part of the hinge 92 received in the cavity 102 is substantially concealed when the removable cover plate 104 is secured to the extrusion 100. As can be seen most clearly in FIG. 18*b*, the cover plate 104 is formed with a pair of narrow rectangular apertures 106, sized to receive there-through the part of the hinge 92 which is received in the cavity 102. Both the part of the hinge 92 and the screw fasteners 94 will be concealed within the cavity, providing a more aesthetically pleasing finish for the door frame.

The embodiment in FIGS. 15 to 18 is described with respect to concealing a hinge of a door. However it is to be noted that other items of door hardware such as locks could also be concealed in an analogous way to the way the door hinge is concealed, with the appropriate adaptations.

It should be noted that whilst the embodiments have been described with reference to a standard aluminium frame, the invention can be equally applied to a thermally broken aluminium system. In this latter case, as per usual practice, a PVC section or thermal break is included to stop heat transfer from the outside to inside.

FIGS. 19(*a*) to 19(*e*) illustrate a further embodiment of the framing system 110 of the present invention, which may be used in conjunction with the first or second embodiments described above, or as a stand-alone system. The framing system 110 of this embodiment comprises an aluminium extrusion 120 having a channel 122 adapted to receive an edge of a panel 116 therein, the channel being formed by a pair of opposing side walls 124. In this embodiment, a first side wall 124*b* of the channel is formed by part of a removable support member 126 (see FIGS. 19(*c*) to 19(*e*)). The first side 124*b* has a first elongate retention means 128 extending the full length of the extrusion 120 for receiving a first wedge member 112 in connection therewith. The first wedge member 112 is made of resilient material for securing and sealing the panel 116 in the framing system.

The framing system 110 further comprises a removable cover plate 130 adapted to be secured to the extrusion 120 and received in close proximity to a top edge of the first side wall 124*b* of the channel 122. In use, when a panel 116 is installed in the channel 122 with the first wedge member 112 received in connection with the first retention means 128, the first wedge member is substantially concealed when the removable cover plate 130 is secured to the extrusion 120.

Preferably the first wedge member 124 is one of a pair of wedge members, and the framing system 110 further comprises a second wedge member 114 made of resilient material for securing and sealing a panel in the framing system. Preferably a second side wall 124*a* is formed with a second elongate retention means 132, extending the full length of the extrusion 120, for receiving the second wedge member 114 in connection therewith.

As with the first and second embodiments, an elongate lip 136 is provided along a top edge of the second side wall 124*a* of the channel 122. Preferably both the elongate lip 136 and the cover plate 130 each have an edge that lies adjacent to and in close proximity to the panel 116 after installation.

The aluminium extrusion 120 of this embodiment is referred to as a sill section 120, as it is typically employed as the bottom frame member in a window or door frame. With a typical window frame there are four side frame members. The two vertical side frame members and the top side frame member would typically comprise the aluminium extrusion 20 or 50 of the first and second embodiments. However the fourth side frame member, which is normally the bottom or sill, the sill section 120 is employed, which is open on one side. The reason why the sill section 120 is open on one side is so that a glass pane can be inserted into the assembled window frame. In theory, it is possible to use the sill section 120 on all four sides of the frame to glaze a window.

A preferred method of installing a panel 116, for example a pane of glass, in the aluminium extrusion 120 of the framing system 110 will now be described with reference to FIGS. 19(*a*) to 19(*e*).

Firstly, the second wedge member 114 is preferably inserted in connection with the second elongate retention means 132 on the second side wall 24*a*. It will be seen that the position of the second elongate retention means 132 on the second side wall 124*a*, and the shape of the second wedge member 114 is such that it is substantially concealed below the elongate lip 126, when installed.

Next the glass pane 116 is installed in the frame, with an edge of the pane 116 received in the channel 122, to be formed in the aluminium extrusion 120, pressed against the second wedge member 114, as shown in FIG. 19(*b*). The channel 122 is, of course, designed and sized to receive a pane of this particular thickness therein. When the pane 116 is installed in the channel 122 an elongate edge of the elongate lip 126 lies adjacent to and in close proximity to the pane 116.

With the glass pane 116 thus correctly positioned in the channel 122, the support member 126 is then clipped into place, as shown in FIGS. 19(*c*) to 19(*e*). A foot on the support member 126 hooks under a first elongate retaining clip 118 provided on the aluminium extrusion 120, and the support member 126 then snaps into place. The first side wall 124*b* on the support member 126, together with the second side wall 124*a*, now forms the channel 122 of the aluminium extrusion 120.

Next, the first wedge member 112 is inserted into the narrow gap between the pane 116 and the first side wall 124*b* of the channel 122, as shown in FIG. 19(*d*). The first wedge member 112 is designed so that it can be squeezed into this narrow gap, as shown in FIGS. 119(*d*) and 119(*e*). A rear surface of the first wedge member 112 is formed with a protruding rib that catches the first elongate retention means 128. Once the first wedge member 112 is thus wedged into the narrow gap between the pane 116 and the second wall 124*b* of the channel 122, and retained by the first elongate retention means 128, it is virtually impossible to remove it, and the glass pane 116 will remain firmly and securely wedged in the channel 122.

Finally, the removable cover plate 130 is installed in the aluminium extrusion 120, as shown in FIG. 119(*e*). The removable cover plate 130 of this embodiment is provided with first and second elongate retaining clips on each edge along its length, which are designed to clip under matching elongate protrusions provided on support member 126 and the aluminium extrusion 120. Once the removable cover plate 130 is installed, an elongate edge of the removable cover plate 130 lies adjacent to and in close proximity to the glass pane 116, on the opposite side to the elongate lip 126. As with the previous embodiments, the removable cover plate 130 ensures that the first wedge member 112 is substantially concealed and hidden from view, when the removable cover plate 130 is secured to the extrusion 120. The end result is a more aesthetically pleasing appearance of the join between the glass pane and the aluminium extrusion.

FIGS. 20(*a*) to 20(*e*) illustrate a still further embodiment of the framing system 140 of the present invention, comprising an aluminium extrusion in the form of a window sash section 150 for a sash window (or sliding window). The aluminium extrusion 150 has a channel 152 adapted to receive an edge of a glass pane 154 therein, the channel being formed by a pair of opposing side walls 142. In this embodiment, a first side wall 142*b* of the channel is formed by part of a removable support member 158 (see FIGS. 20(*b*), 20(*e*) and 20(*f*)). The first side 142*b* has a first elongate retention means extending the full length of the support member 158 for receiving a first wedge member 156 in connection therewith. The first wedge member 156 is made of resilient material for securing and sealing the panel 116 in the framing system.

The support member 158 is clipped into place on the aluminium extrusion 150, as shown in FIGS. 20(*e*) and 20(*f*). A foot on the support member 126 hooks under a first elongate retaining clip 118 provided on the aluminium extrusion 120, and the support member 126 can then be snapped into place. The first side wall 124*b* on the support member 126, together with the second side wall 124*a*, now forms the channel 122 of the aluminium extrusion 120.

The framing system 140 further comprises a removable cover plate 144 adapted to be secured to the extrusion 150 and received in close proximity to a top edge of the first side wall 142*b* of the channel 152. In use, when the pane 154 is installed in the channel 152 with the first wedge member 156 received in connection with the first retention means, the first wedge member is substantially concealed when the removable cover plate 144 is secured to the extrusion 150.

The manner in which the removable cover plate 144 is secured to the extrusion 150, is similar to the second embodiment of the framing system 40. The removable cover plate 144 of this embodiment, is provided with a first elongate retaining clip on one edge along its length, which is designed to engage a matching elongate recess provided on the removable support member 158. A second elongate retaining clip 152 is provided along its length, intermediate the width of the removable cover plate 144 (see FIG. 20(*c*)), which is adapted to engage with a securing clip 146 provided in connection with the support member 158.

The removable support member 158 of this embodiment is provided with an additional elongate protrusion 148 (see FIG. 20(*b*)), provided along its length, intermediate the width of the support member. The protrusion 148 is designed to receive the securing clip 146 in connection therewith. When the first wedge member 156 has been inserted in the first elongate retention means, the removable cover plate 144 is clipped into place and secured to the support member 158, as shown in FIG. 20(*f*), so that the first wedge member 156 will be substantially concealed. The end result is a more aesthetically pleasing appearance of the join between the pane 16 and the aluminium extrusion (sash section) 150.

A still further embodiment of an aluminium extrusion framing system 160 in accordance with the invention is illustrated in FIGS. 21 to 24. The framing system 160 is similar to the first embodiment of the framing system 10, and therefore the similar parts are identified with the same reference numerals and will not be described again in detail. As with the framing system 10, the framing system 160 comprises a removable cover plate 30 adapted to be secured to the extrusion 20 and received in close proximity to a top edge of the first side wall 24*b* of the channel 22 whereby, in use, when the panel 16 is installed in the channel 22 with the first wedge member 12 received in connection with the first retention means 28, the first wedge member 12 is substantially concealed when the removable cover plate 30 is secured to the extrusion 20.

Advantageously, the cover plate 30 can also be used to conceal other things within the aluminium extrusion 20. In this embodiment the cover plate 30 is used to conceal a lighting fixture 162, which is installed behind the removable cover plate 30, in a cavity provided within the aluminium extrusion wherein, in use, a lighting effect can be created adjacent to the panel 16. In the illustrated embodiment the lighting effect is a pattern, words, logo or other indicia 164 laser-cut into the cover plate 30 so that, in use, when the lighting fixture 162 is switched ON light shines through laser-cut indicia to create the lighting effect.

Figure 22:
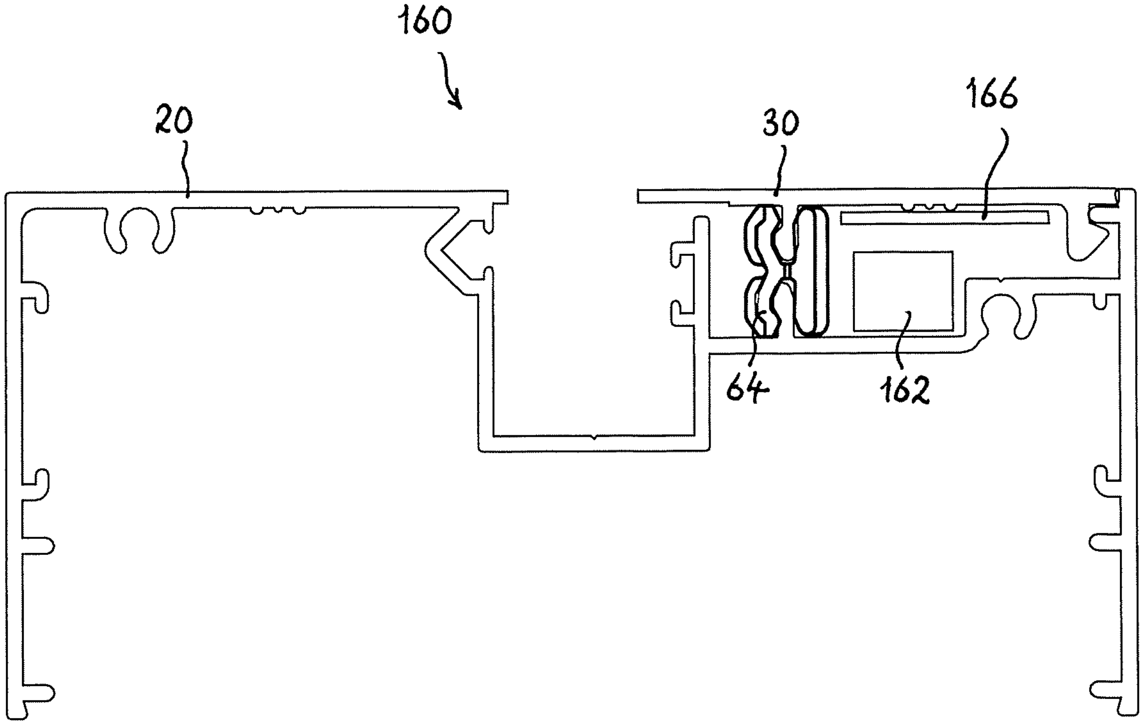
FIG. 22 is a section view through the aluminium extrusion framing system of FIG. 21 illustrating one way of creating a lighting effect.
Figure 23:
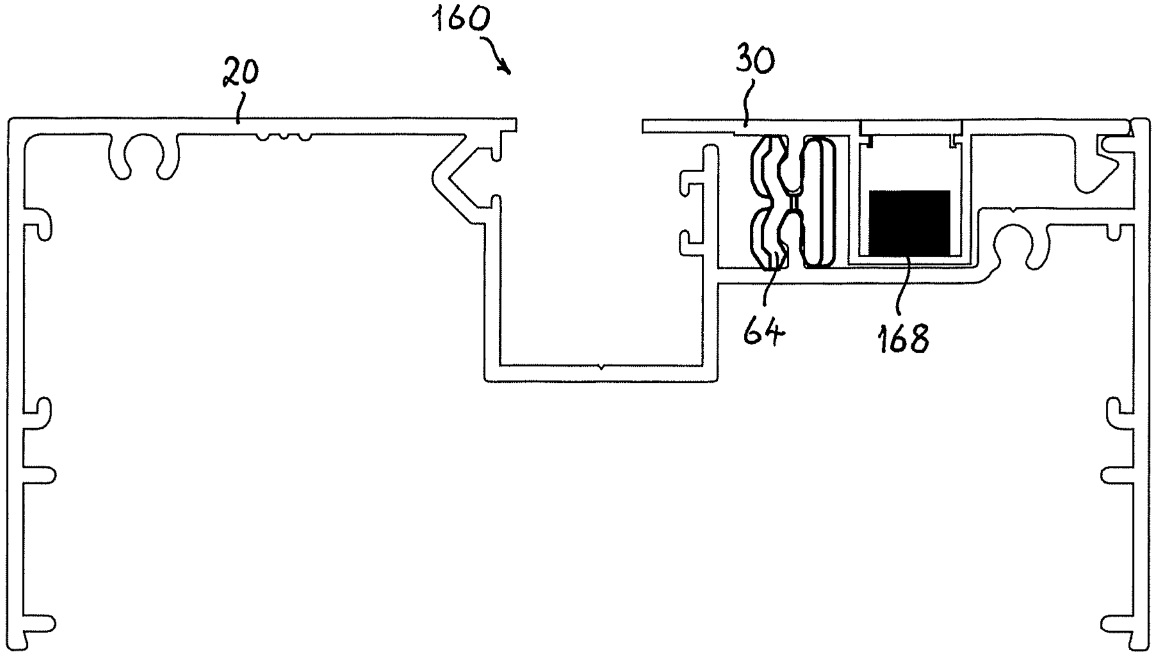
FIG. 23 is a section view through the aluminium extrusion framing system of FIG. 21 illustrating another way of creating a lighting effect.
Figure 24:
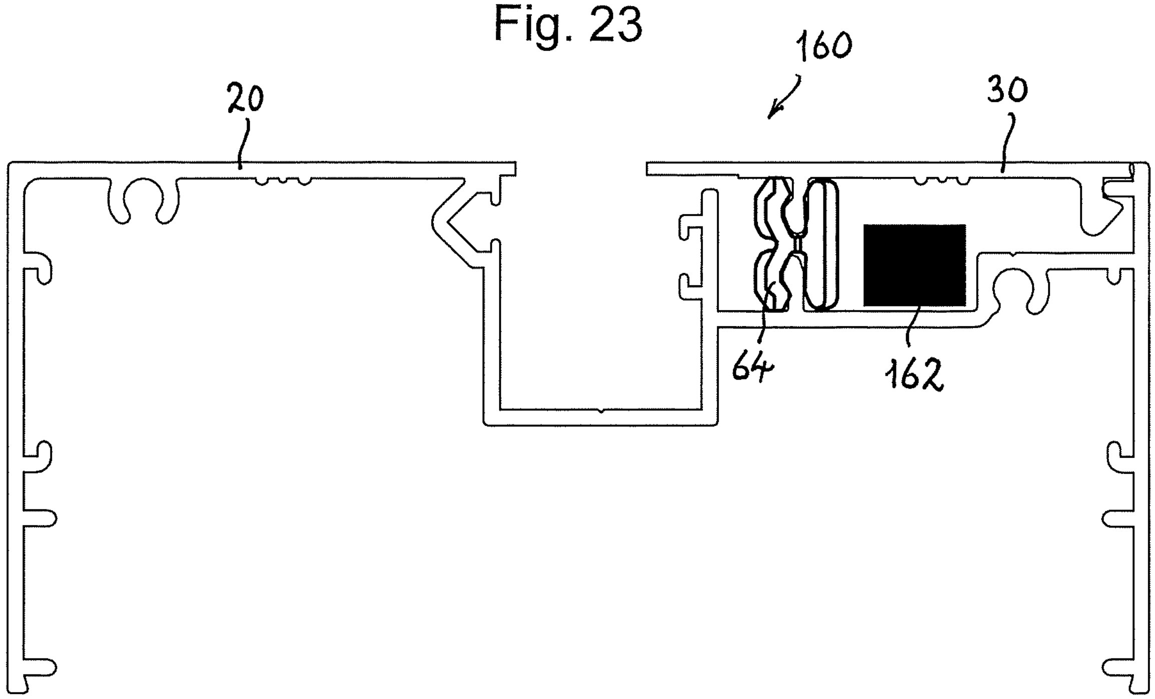
FIG. 24 is a section view through the aluminium extrusion framing system of FIG. 21 illustrating a third way of creating a lighting effect.
Figure 25:
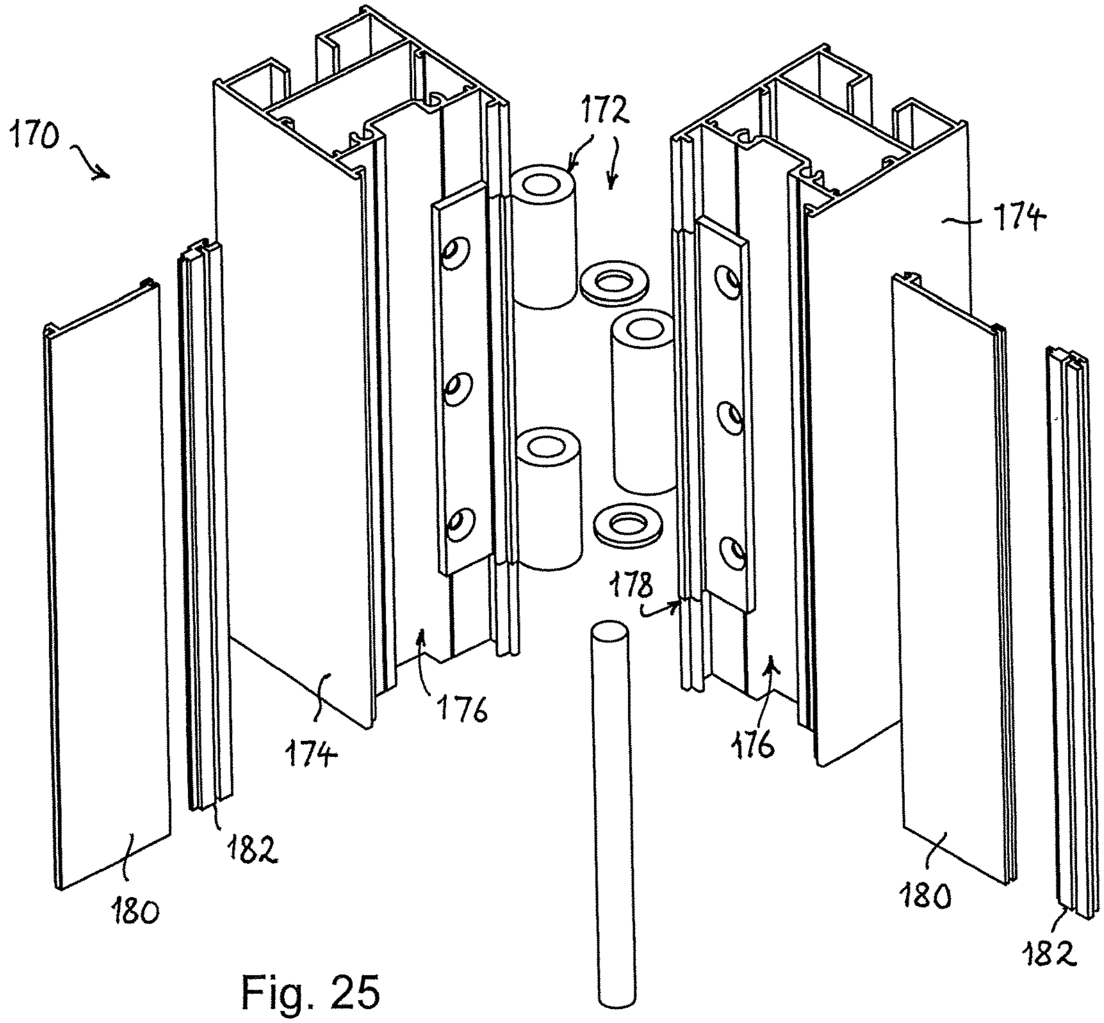
FIG. 25 is an exploded perspective view of still another embodiment of an extrusion framing system according to the present invention, for partly concealing a hinge.

Typically the lighting fixture 162 is an LED array mounted directly behind the cover plate 30, within the cavity provided within the aluminium extrusion 20, as shown in FIG. 24. Preferably a coloured filter and/or diffuser 166 is also installed behind the cover plate 30, between the lighting fixture 162 and the laser-cut indicia as shown in FIG. 22, to enhance the lighting effect. Alternatively, instead of laser-cut indicia, an aperture is provided in the cover plate 30 within which a another kind of lighting fixture 168 is received, having a source of light and colour filter and/or diffuser integral to the fixture, as shown in FIG. 23.

FIGS. 25 to 39 illustrate another embodiment of an extrusion framing system 170 according to the present invention, which can be used for concealing part of the hinge of a door/window or other panel. In particular it is designed to create a smooth, uninterrupted finish by concealing the screw fixings of a hinge 172, in this case for a door to door hinge connection of, for example, a bi-fold door with glass panels mounted within each sash. It allows for an uninterrupted seal from top to bottom of the panel, therefore increasing the weather-ability of the system.

The framing system 170 comprises substantially identical first and second door frame extrusions 174 forming a sash section for the glazed doors. In this embodiment each extrusion 174 comprises a cavity 176 within which part of a hinge 172 can be concealed. As can be clearly seen in FIGS. 25 and 26 a cut-out 178 is provided in an edge of the sash section through which part of the hinge to be concealed is extended so as to be received in the cavity 176. Furthermore, the hinge 172 itself has a modified shape to match the profile of the extrusion 174, as can be seen most clearly in FIGS. 28(*b*) and 29, so that when the hinge 172 is received in the cavity part of the hinge replaces the cut-out portion 178 of the sash section.

Figure 26:
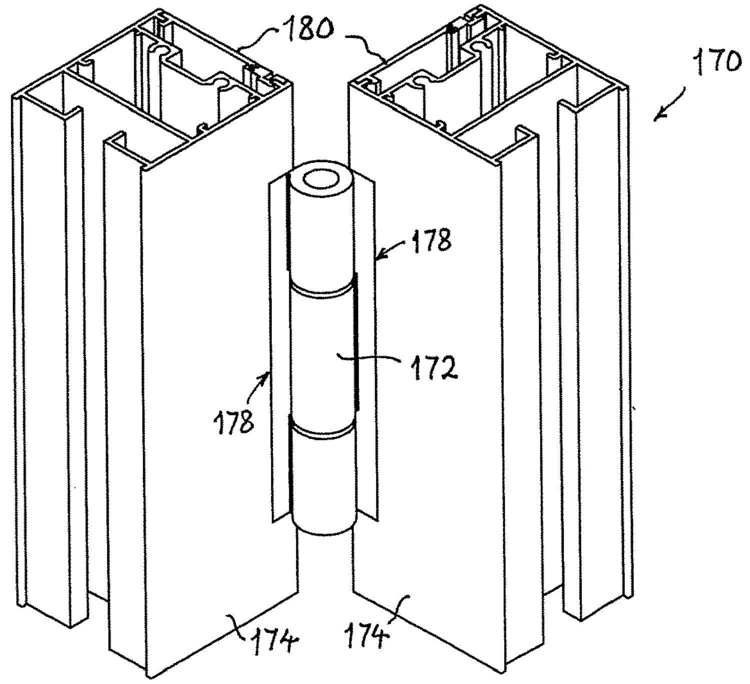
FIG. 26 is a front perspective view of the extrusion framing system of FIG. 25.
Figure 27:
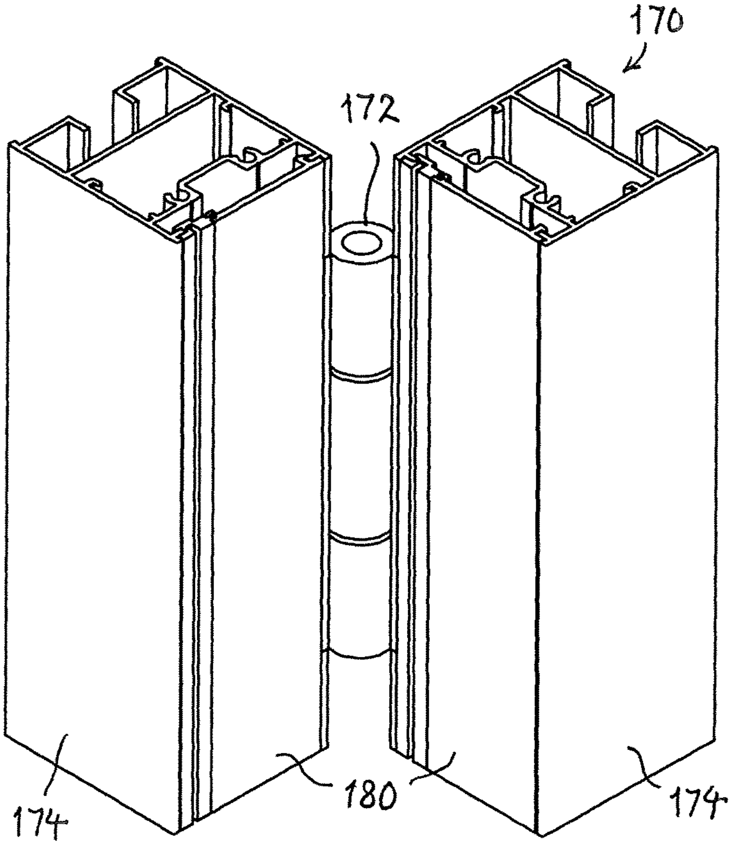
FIG. 27 is a rear perspective view of the extrusion framing system of FIG. 25.
Figure 28A:
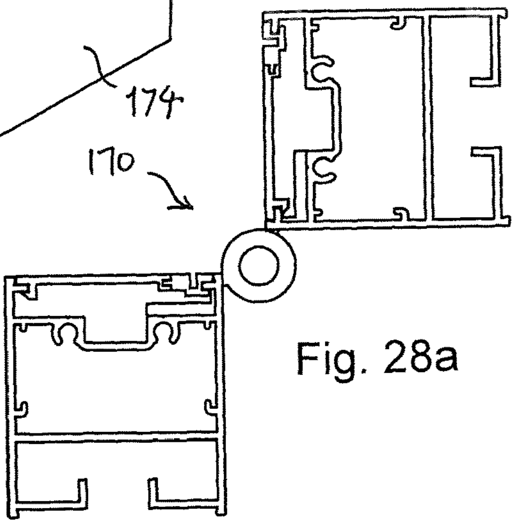
FIG. 28(*a*) is a top plan view of the extrusion framing system of FIG. 26.
Figure 29:
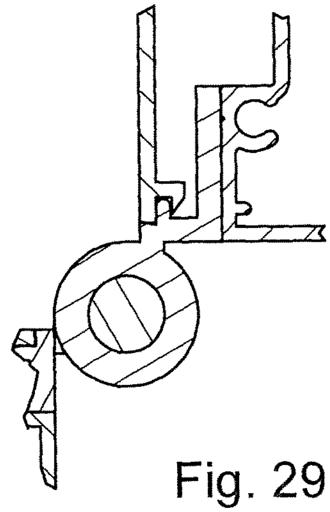
FIG. 29 is an enlargement of the framed part of FIG. 28(*b*)
Figure 28B:
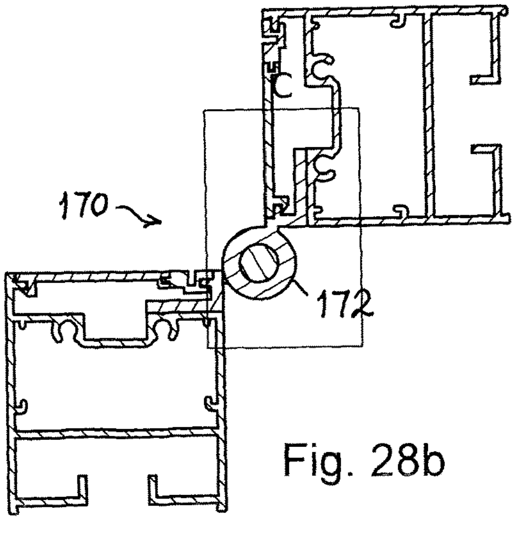
Figure 30:
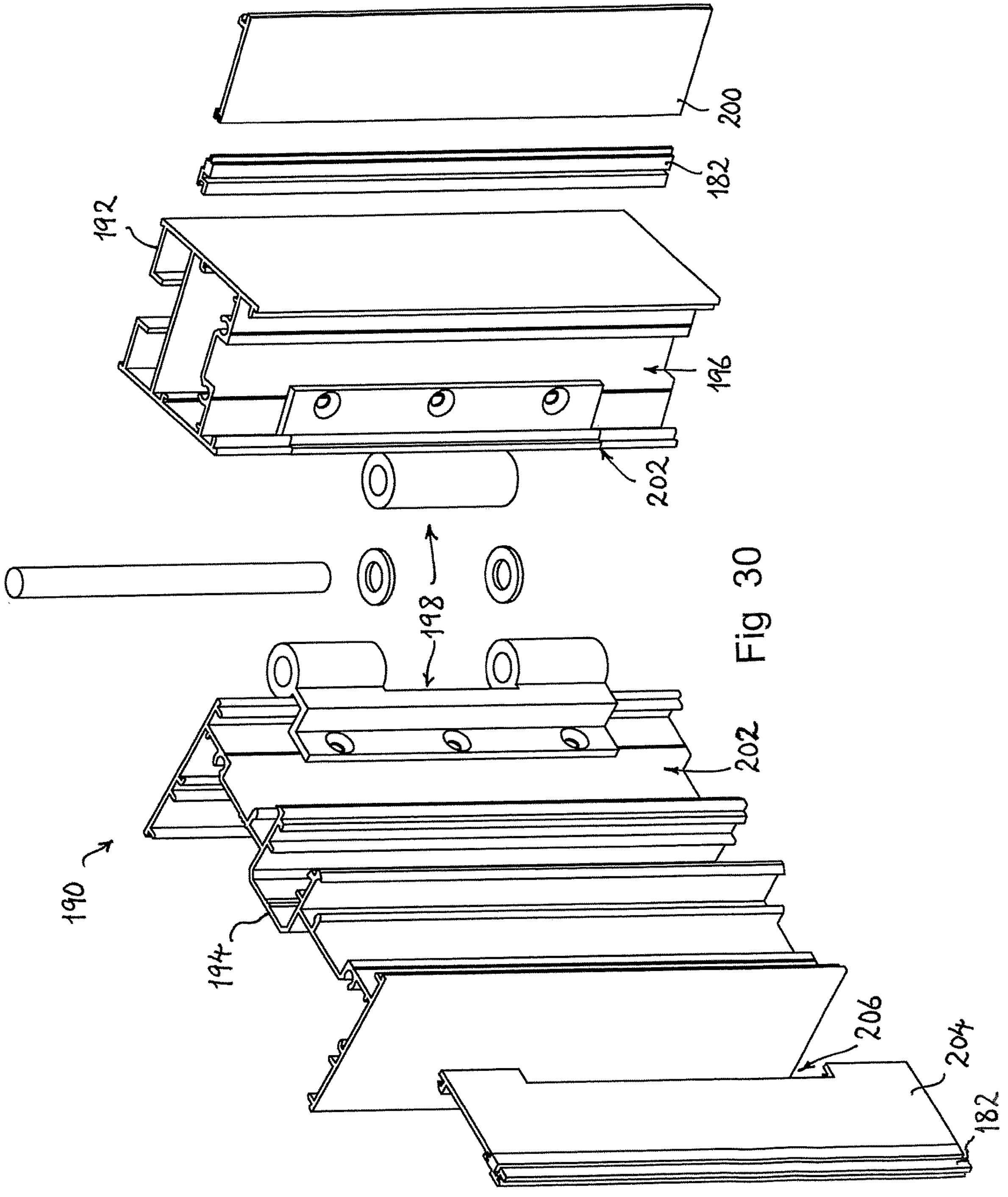
FIG. 30 is an exploded perspective view of yet another embodiment of an extrusion framing system according to the present invention, for partly concealing a hinge.

The framing system 170 further comprises a pair of cover plates 180 which can be secured to the respective extrusions 174, and is adapted to cover each cavity 176. In use, the part of the hinge 172 received in the cavity 176 is substantially concealed when the removable cover plates 180 are secured to the respective extrusions 174. As can be seen most clearly in FIG. 25, each cover plate 180 is formed with a narrow thermal break 182, which extends the full length of the cover plate 180. Both the parts of the hinge 172 and the screw fasteners used to secure the hinge to the sash, will be concealed within the respective cavities 176, to provide a more aesthetically pleasing finish for the door frame, as shown in FIGS. 26 and 27.

It will be apparent that the aforementioned embodiment of an extrusion framing system 170 for concealing part of the hinge of a door/window or other panel need not be manufactured from extruded aluminium. It may be extruded from any suitable material, including, for example, UPVC, fibreglass or other rigid plastics or composite materials. It can also be made from a combination of such materials. This is also true of the embodiments illustrated in FIGS. 30 to 36.

FIGS. 30 to 33 illustrate another embodiment of an extrusion framing system 190 according to the present invention, which can be used for concealing part of the hinge of a door/window or other panel. The framing system 190 comprises a door frame extrusion 192, which is similar to the aluminium extrusion 174 of the previous embodiment, and a door jamb extrusion 194. In this embodiment the extrusion 192 comprises a cavity 196 within which part of a hinge 198 can be concealed. The extrusion 192 would typically form part of a frame or sash section for a glazed door (not shown). As can be clearly seen in FIG. 30 a cut-out 202 is provided in one edge of the sash section through which part of the hinge 198 to be concealed is extended so as to be received in the cavity 196. Furthermore, the hinge 198 itself has a modified shape to match the profile of the extrusion 192, as can be seen most clearly in FIGS. 32 and 33, so that when the hinge 198 is received in the cavity part of the hinge replaces the cut-out 202 in the edge of the sash section. The framing system 190 further comprises a cover plate 200 which can be secured to the extrusion 192, and is adapted to cover the cavity 196.

Figure 31:
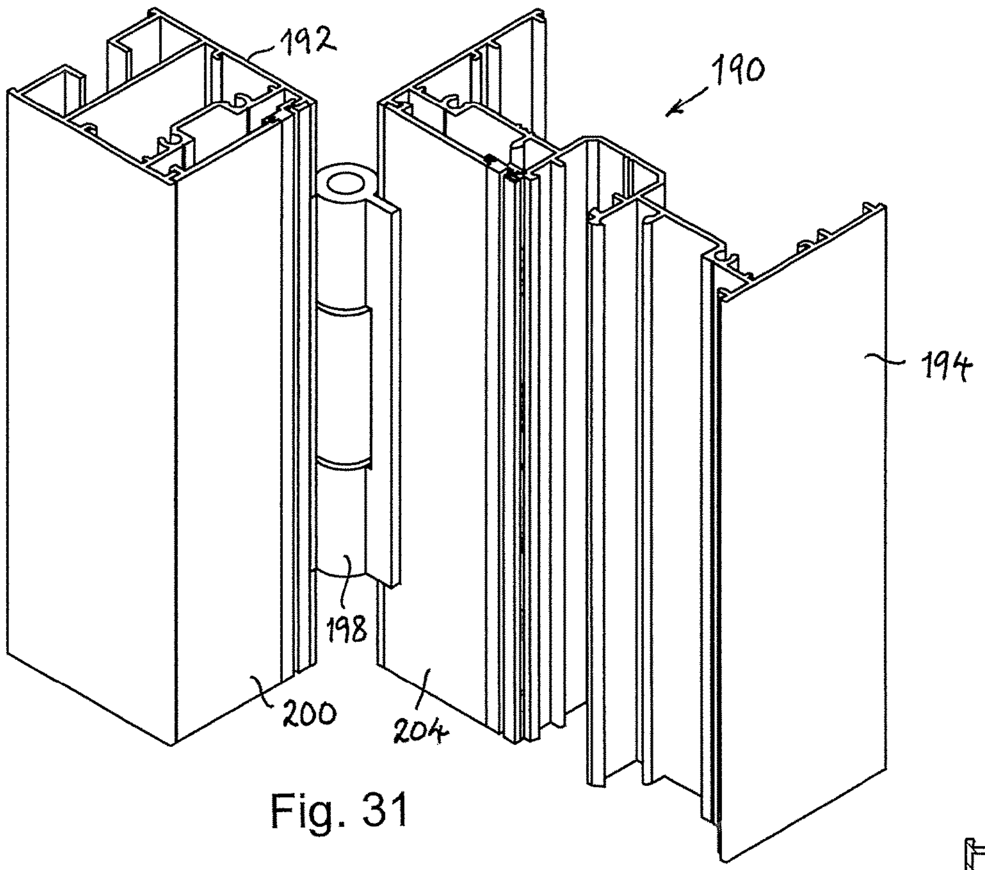
FIG. 31 is a front perspective view of the extrusion framing system of FIG. 30.
Figure 33:
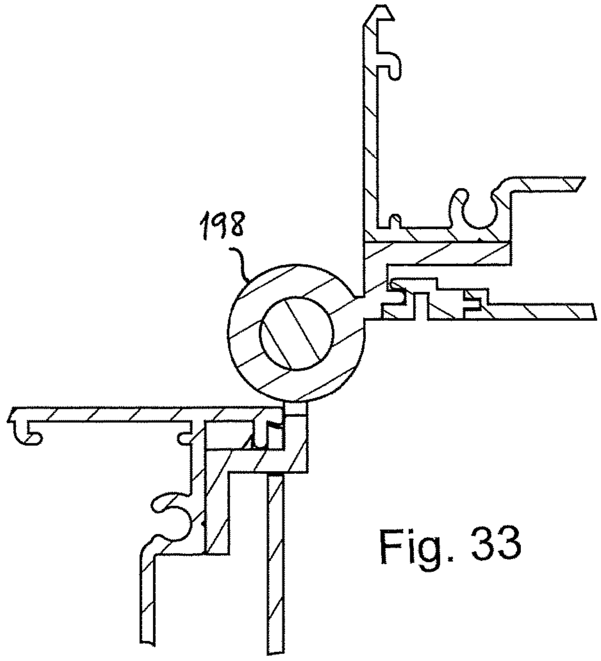
FIG. 33 is an enlargement of the framed part of FIG. 32.
Figure 32:
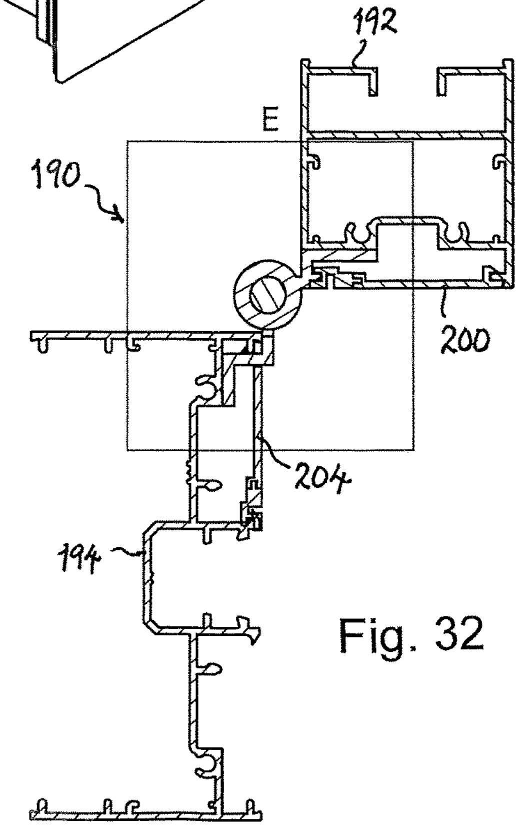
FIG. 32 is a section view through the extrusion framing system of FIG. 31.

The framing system 190 also comprises a door jamb extrusion 194, which comprises a cavity 202 within which the other part of the hinge 198 can be concealed. The extrusion 194 would typically form part of a jamb for a door (not shown). The framing system 190 further comprises a cover plate 204 which can be secured to the extrusion 194, and is adapted to cover the cavity 202. In use, the part of the hinge 198 received in the cavity 202 is substantially concealed when the removable cover plate 204 is secured to the extrusion 194. As can be seen most clearly in FIG. 30, the cover plate 204 is formed with a narrow rectangular aperture 206, sized to receive there-through the part of the hinge 198 which is received in the cavity 202. Both the part of the hinge 198 and the screw fasteners will be concealed within the cavity, providing a more aesthetically pleasing finish for the door jamb, as shown in FIG. 31.

As with the previous embodiment, each cover plate 200 and 204 is formed with a narrow thermal break 182, which extends the full length of the cover plate.

The embodiments in FIGS. 25 to 33 are described with respect to concealing a hinge of a door. However, as previously noted, other items of door hardware such as locks could also be concealed in an analogous manner to the way the door hinge is concealed, with the appropriate adaptations.

Figure 34:
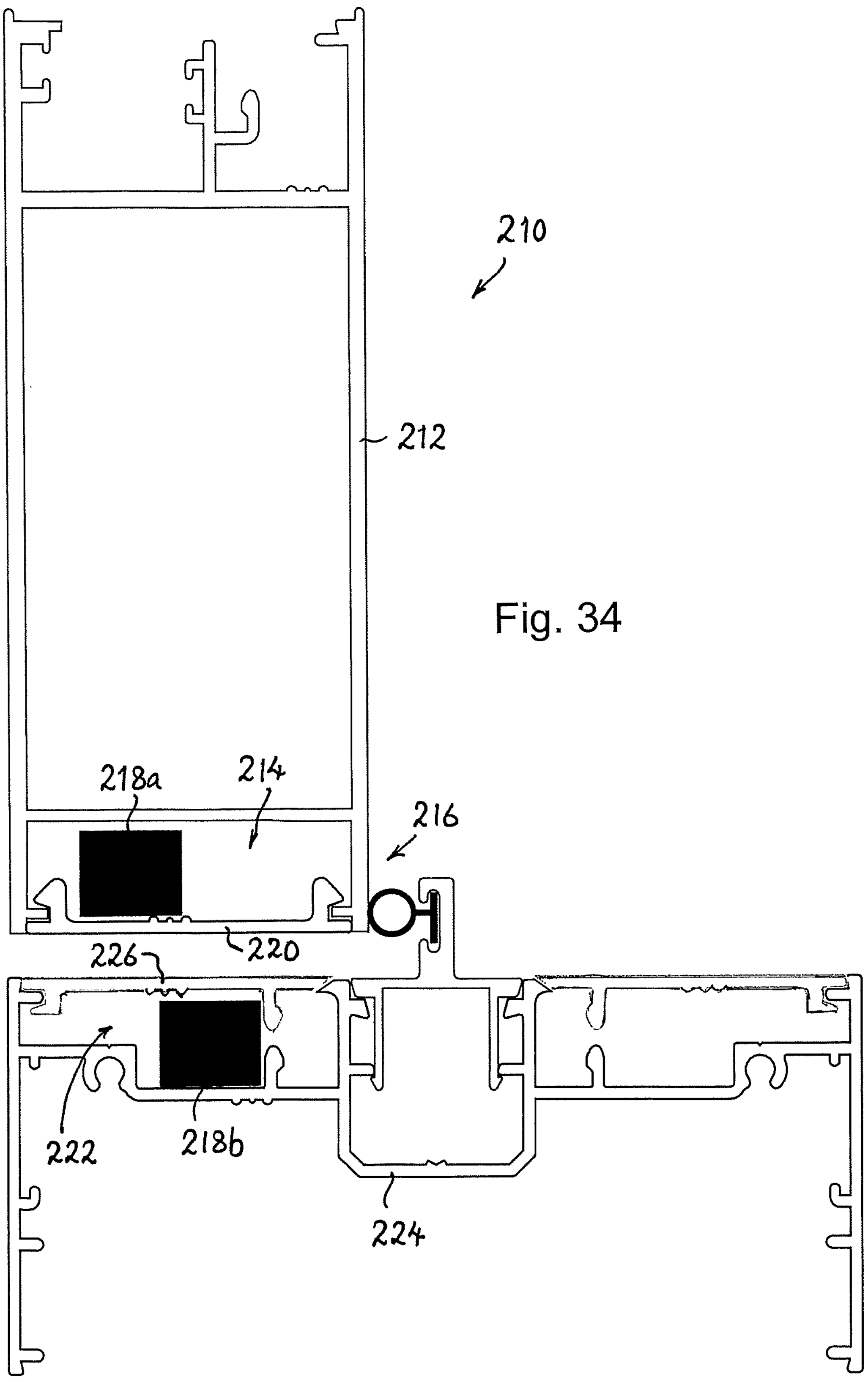
FIG. 34 is a section view through a still further embodiment of an extrusion framing system according to the present invention, illustrating one way of concealing a magnetic catch.
Figure 35:
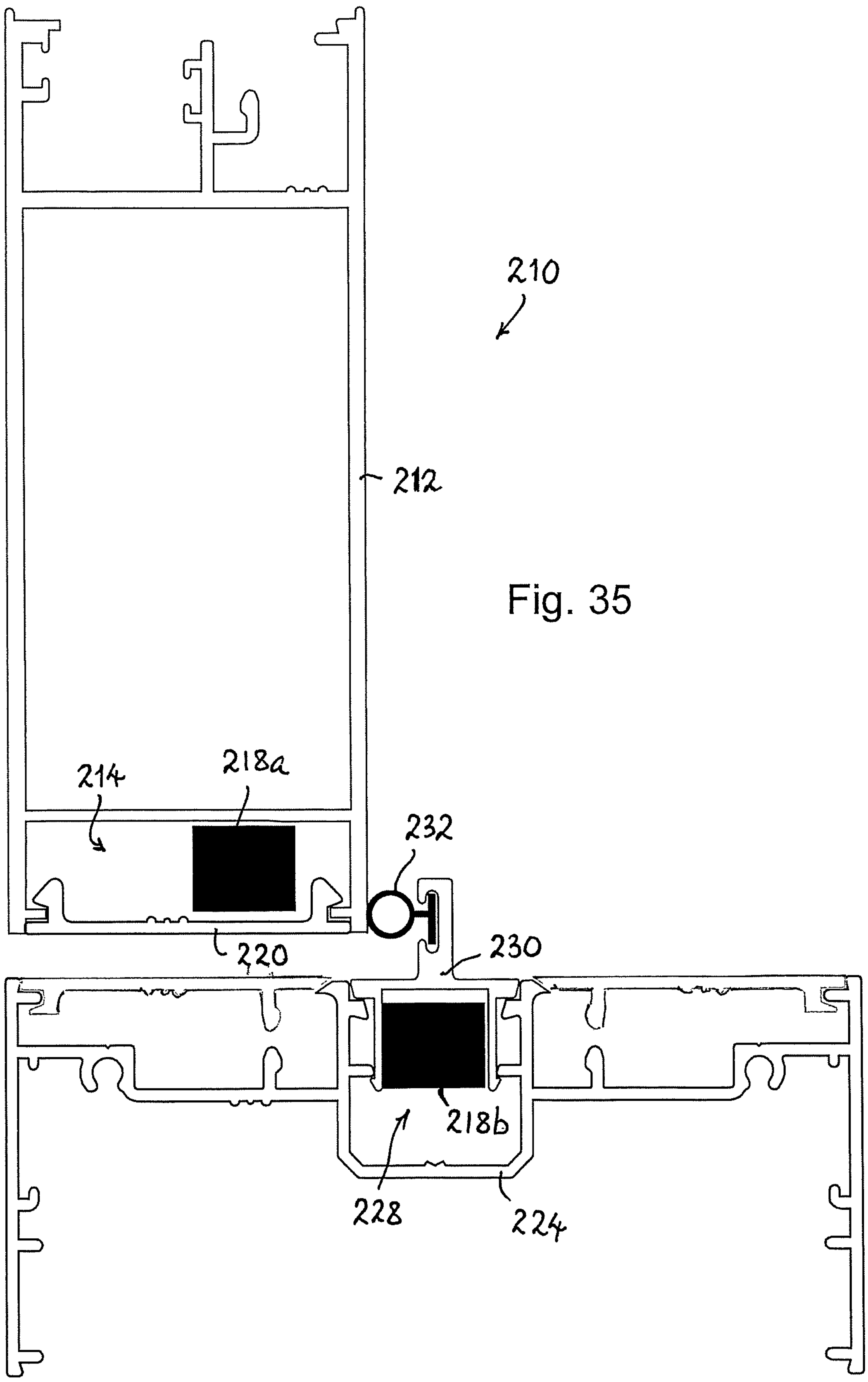
FIG. 35 is a section view through the extrusion framing system of FIG. 34 illustrating another way of concealing a magnetic catch.
Figure 36:
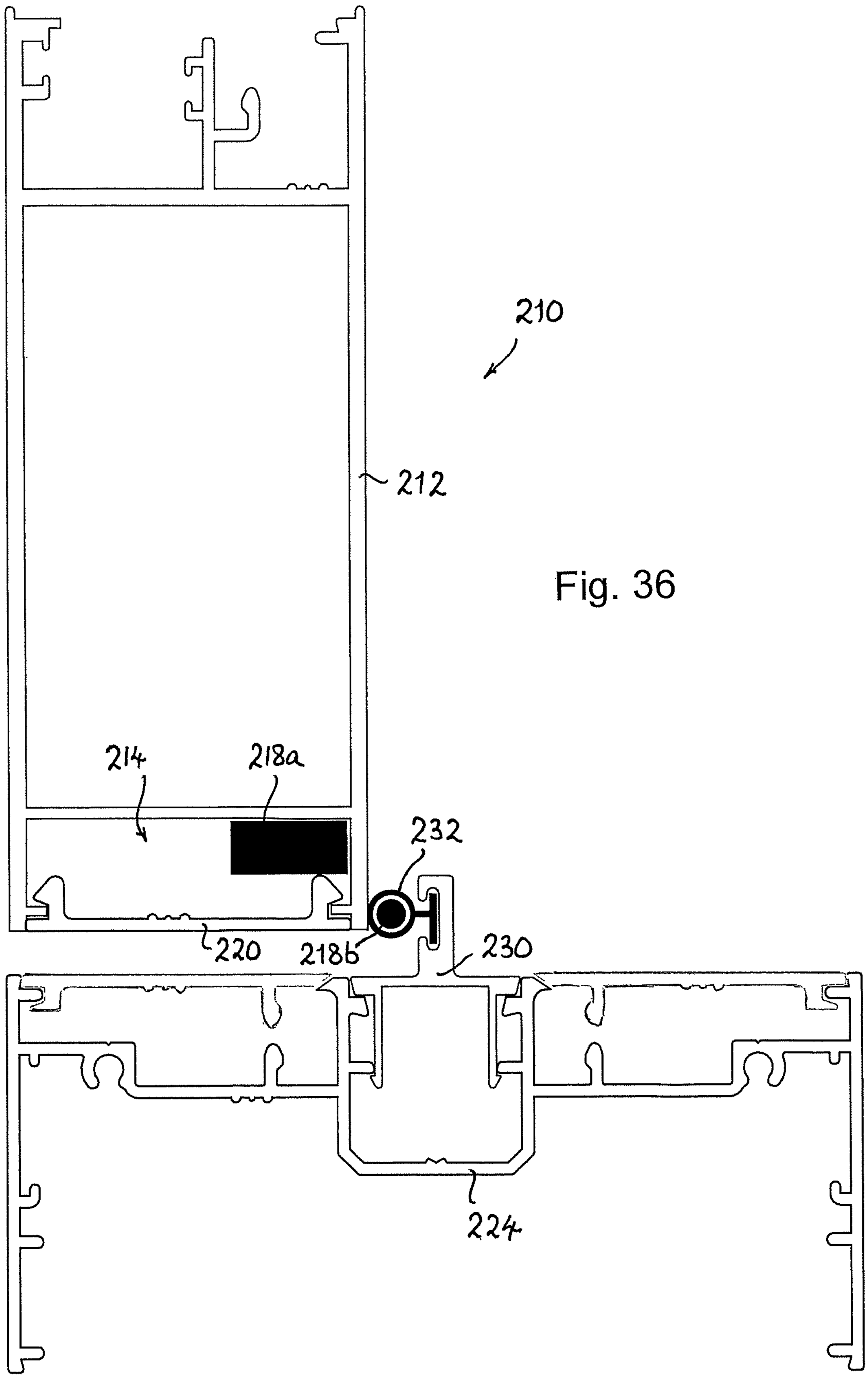
FIG. 36 is a section view through the extrusion framing system of FIG. 34 illustrating a third way of concealing a magnetic catch.

FIGS. 34 to 36 illustrate another embodiment of an extrusion framing system 210 according to the present invention, which can be used for concealing part or all of a holding mechanism for holding a panel in place in the framing system. The holding mechanism may be the fixing or body of a lock, hinge, magnetic catch or any other mechanism for holding a door, window or other panel in place. The framing system 210 comprises an extrusion 212 having a cavity 214 in which part of a holding mechanism for holding a panel in place in the framing system can be concealed. In each case, the holding mechanism comprises a mechanism that is adapted to be mechanically connected to the extrusion and/or the door, window or other panel.

In the illustrated embodiments of FIGS. 34 to 36 the holding mechanism for holding a panel in place in the framing system 210 is a magnetic catch mechanism 216. Typically the magnetic catch mechanism comprises first and second magnets 218*a* and 218*b*, which when brought into close proximity exert a strong attractive force to retain the panel in a closed position.

In the embodiment shown in FIG. 34, the first magnet 218*a* is concealed within the cavity 214 in the extrusion 212 forming a frame for the panel. A removable cover plate 220, adapted to be secured to the extrusion 212, is provided to conceal the first magnet 218*a* within the cavity 214. The second magnet 218*b* is concealed within a cavity 222 in an extrusion 224 used to form a jamb for the panel. A removable cover plate 226, adapted to be secured to the extrusion 224, is provided to conceal the second magnet 218*b* within the cavity 222.

In the embodiment shown in FIG. 35, the first magnet 218*a* is concealed within the cavity 214 in the extrusion 212 forming a frame for the panel, similar to that shown in FIG. 34. A cover plate 220 is provided to conceal the first magnet 218*a* within the cavity 214. However, the second magnet 218*b* is concealed within another cavity 228 of the extrusion 224 used to form a jamb for the panel. A removable cover plate 230, adapted to be secured to the extrusion 224, is provided to conceal the second magnet 218*b* within the cavity 228. The removable cover plate 230 of this embodiment is also used to support a rubber door seal 232, which presses against the frame 212 for the panel, when it is in the closed position.

In the embodiment shown in FIG. 36, the first magnet 218*a* is again concealed within the cavity 214 in the extrusion 212 forming a frame for the panel, similar to that shown in FIG. 34, except that the magnet 218*a* is located nearer to one side of the frame. A cover plate 220 is provided to conceal the first magnet 218*a* within the cavity 214. The second magnet 218*b* is concealed within the rubber door seal 232, which is supported on the removable cover plate 230, provided on the extrusion 224 for the jamb for the panel.

Figure 40:
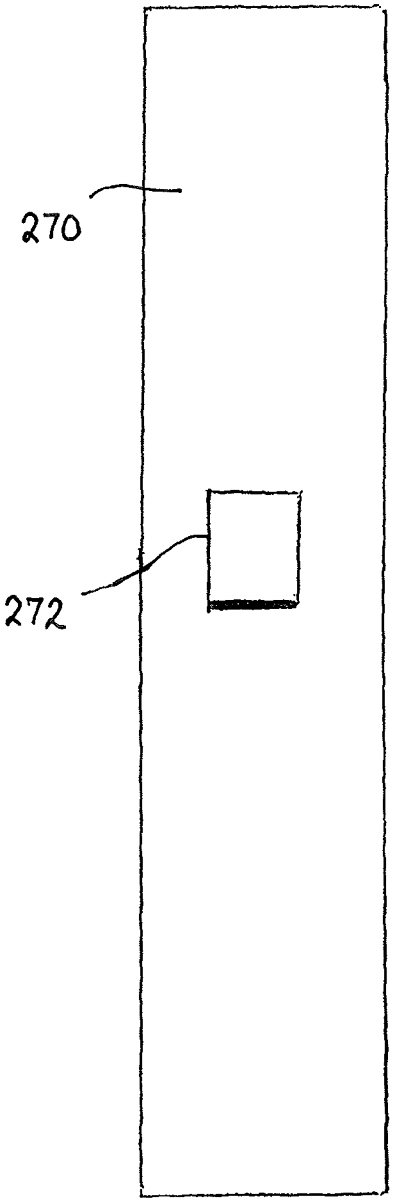
FIG. 40 is a plan view of a cover plate for the extrusion framing system of FIG. 41 used for concealing part of a lock mechanism; and, FIG. 41 is a section view through a still further embodiment of an extrusion framing system according to the present invention, illustrating one way of concealing part of a lock mechanism for a door.
Figure 41:
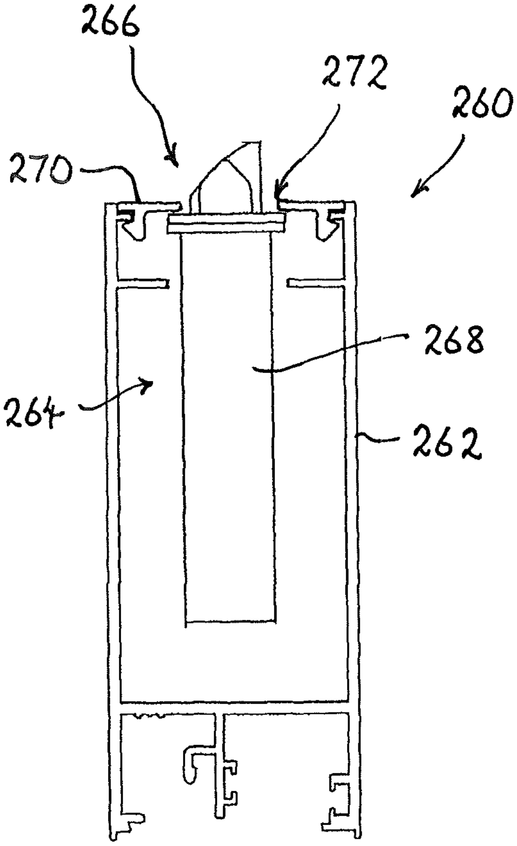

FIGS. 40 and 41 illustrate another embodiment of an extrusion framing system 260 according to the present invention, which can be used for concealing part or all of a holding mechanism for holding a panel in place in the framing system. The framing system 260 comprises an aluminium frame extrusion 262 for a door having a cavity 264 in which part of a lock mechanism 266 for holding a panel in place in the framing system can be concealed.

In the embodiment of FIGS. 40 and 41 the holding mechanism for holding a panel in place in the framing system 260 is a lock mechanism 266. Typically the lock mechanism 266 comprises a latch mechanism 268, which has a latch that extends into a door frame (not illustrated) through a strike plate, to retain the door in a closed position. In the embodiment shown in FIG. 41, the latch mechanism 268 is concealed within the cavity 264 in the extrusion 262 forming a frame for the door. A removable cover plate 270, adapted to be secured to the extrusion 262, is provided to conceal the part of the latch mechanism within the cavity 264. The cover plate 270 is provided with an aperture 272, as shown in FIG. 40, through which the latch of the latch mechanism protrudes. This is the only part of the latch mechanism 268 which is normally visible.

In each of the embodiments illustrated in FIGS. 34 to 36, 40 and 41 it will be seen that, in use, at least part of the holding mechanism is substantially concealed when the removable cover plates are secured to the respective extrusions.

Figure 37:
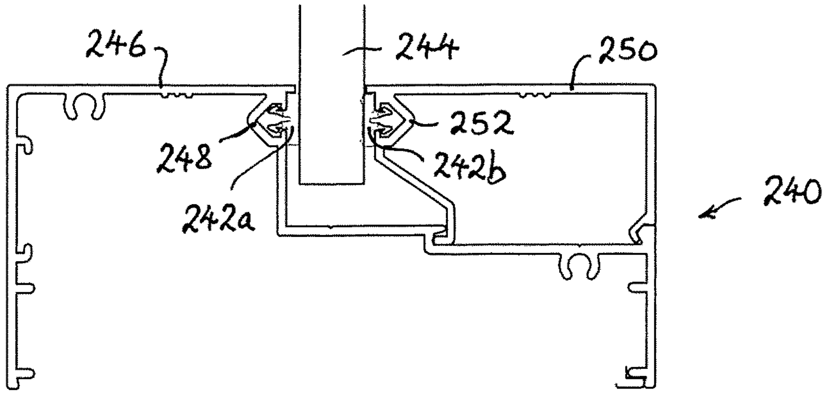
FIG. 37 is a section view through yet another embodiment of an aluminium extrusion framing system according to the present invention.
Figure 38:
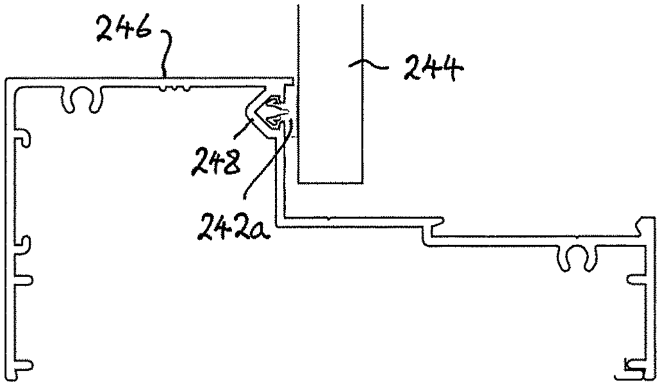
FIG. 38 is section view through the aluminium extrusion framing system of FIG. 37 partially disassembled.
Figure 39A:
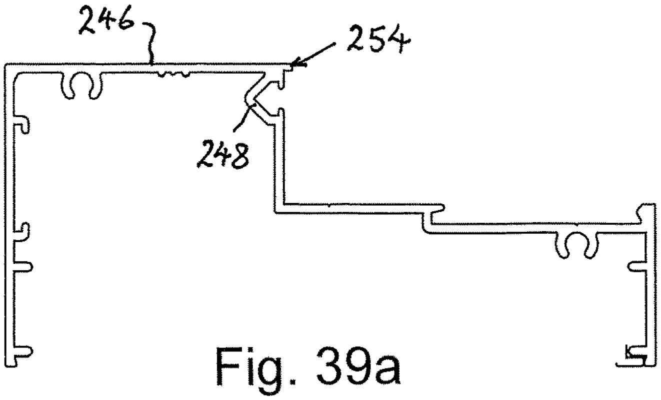
FIGS. 39(*a*) and 39(*b*) illustrate two parts of the aluminium extrusion framing system of FIG. 37.
Figure 39B:
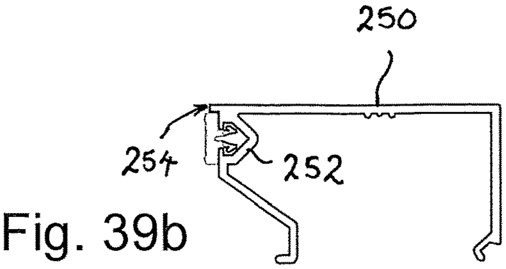

Yet another embodiment of the aluminium extrusion framing system 240 according to the present invention is illustrated in FIGS. 37 to 39. The framing system 240 comprises first and second wedge members 242*a* and 242*b* made of resilient material for securing and sealing a panel 244 in the framing system. The first and second wedge members 242 are similar to the second wedge member 14 of the first embodiment illustrated in FIGS. 1 to 10.

The framing system 240 further comprises a first aluminium extrusion 246 forming a channel adapted to receive an edge of the panel 244 therein, the channel being formed by a pair of opposing side walls. A first side wall of the channel has a first elongate retention means 248 extending the full length of the extrusion 246 for receiving the first wedge member 242*a* in connection therewith.

A second aluminium extrusion 250 is adapted to be secured to the first extrusion 246 and provides a second side wall of the pair of opposing side walls forming the channel, as shown in FIG. 37. The second side wall has a second elongate retention means 252 extending the full length of the extrusion 250 for receiving the second wedge member 242*b* in connection therewith. In use, when a panel 244 is installed in the channel with the first wedge member 242*a* received in connection with the first retention means 248, and the second wedge member 242*b* received in connection with the second retention means 252, the first and second wedge members are substantially concealed when the second extrusion 250 is secured to the first extrusion 246.

Preferably an elongate lip 254 is provided along a top edge of both the first and the second side walls of the channel. Preferably the elongate lip 254 provided along the top edge of both the first and the second side walls has an edge that lies adjacent to and in close proximity to the panel 244 after installation, as shown in FIG. 37.

It will be apparent that the removable cover plate in each of the aforementioned embodiments may be made from a different material to the extrusion for the framing system. Furthermore the cover plate can be connected to the extrusion by any suitable means, e.g. plastic clip, magnet, hook and loop fastener, glue, silicon, etc. The framing system of the invention is applicable to all kinds of doors, windows and panels, including awnings, casements, pivoting and sliding or hinged.

Now that several embodiments of the glazing framing system and method have been described in detail, it will be apparent that the described embodiments provide a number of advantages over the prior art, including the following:

(i) They provide a less obvious and more aesthetically pleasing appearance of the join between the glass pane and the aluminium extrusion;

(ii) They do this by concealing the wedge member(s) used for wedging the glass pane into the aluminium extrusion, rendering it/them substantially invisible;

(iii) They can also be used to conceal other kinds of fixings or holding mechanisms for holding a panel in place to produce a more aesthetically pleasing finish.

It will be readily apparent to persons skilled in the relevant arts that various modifications and improvements may be made to the foregoing embodiments, in addition to those already described, without departing from the basic inventive concepts of the present invention. For example, the number, shape and type of the wedge members employed for wedging the panel in the aluminium extrusion may vary significantly from that shown in the accompanying drawings. Therefore, it will be appreciated that the scope of the invention is not limited to the specific embodiments described.

The invention claimed is:

1. A framing system for a panel, the framing system comprising:

an extrusion having a cavity in which part of a hinge for a panel can be concealed, the cavity having a cut-out portion through which part of the hinge to be concealed is extended;

a hinge for the panel, wherein the part of the hinge received in the cavity has a modified shape to match a profile of the extrusion in a region of the cut-out portion, and wherein when the part of the hinge to be concealed is received in the cavity a portion of the hinge replaces the cut-out portion of the cavity, wherein the hinge for the panel is a hinge for holding a door in a door jamb framing system;

a removable cover plate adapted to be secured to the extrusion to cover the cavity whereby, in use, the part of the hinge is substantially concealed when the removable cover plate is secured to the extrusion, a door jamb extrusion, which comprises a second cavity within which the other part of the hinge can be concealed, wherein the door jamb extrusion forms part of a door jamb; and a second cover plate which can be secured to the door jamb extrusion, and is adapted to cover the second cavity, wherein in use, the other part of the hinge received in the second cavity is substantially concealed when a second removable cover plate is secured to the door jamb extrusion, and wherein the second cover plate is formed with a narrow rectangular aperture, sized to receive there-through the other part of the hinge which is received in the second cavity wherein, in use, both the other part of the hinge and screw fasteners will be concealed within the second cavity, providing a more aesthetically pleasing finish for the door jamb.

2. The framing system for a panel as defined in claim 1, wherein the hinge for the panel is a hinge for holding two or more doors together in a bi-fold door framing system.

3. The framing system for a panel as defined in claim 1, wherein the cut-out is provided in an edge of a sash section through which part of the hinge to be concealed is extended, so that when the hinge is received in the cavity part of the hinge replaces the cut-out portion of the sash section.

4. The framing system for a panel as defined in claim 1, wherein the cover plate is formed with a narrow thermal break, which extends the full length of the cover plate.

5. The framing system for a panel as defined in claim 4, wherein both the part of the hinge and screw fasteners used to secure the hinge to the sash, will be concealed within the cavity, to provide a more aesthetically pleasing finish for the door frame.

* * * * *